(12) United States Patent
DeBraal et al.

(10) Patent No.: US 12,067,583 B2
(45) Date of Patent: Aug. 20, 2024

(54) GENERAL CONTENT PERCEPTION AND SELECTION SYSTEM

(71) Applicants: Troy DeBraal, San Diego, CA (US); Nethika Sahani Suraweera, Morison, CO (US); Justin Williams, Littleton, CO (US)

(72) Inventors: Troy DeBraal, San Diego, CA (US); Nethika Sahani Suraweera, Morison, CO (US); Justin Williams, Littleton, CO (US)

(73) Assignee: IMAIGE, INC., San Diego, CA (US)

( * ) Notice: Subject to any disclaimer, the term of this patent is extended or adjusted under 35 U.S.C. 154(b) by 715 days.

(21) Appl. No.: 16/601,555

(22) Filed: Oct. 14, 2019

(65) Prior Publication Data
US 2020/0118029 A1 Apr. 16, 2020

Related U.S. Application Data

(60) Provisional application No. 62/745,428, filed on Oct. 14, 2018.

(51) Int. Cl.
| | |
|---|---|
| G06Q 30/0201 | (2023.01) |
| G06F 40/40 | (2020.01) |
| G06N 5/045 | (2023.01) |
| G06N 20/00 | (2019.01) |

(52) U.S. Cl.
CPC ......... *G06Q 30/0201* (2013.01); *G06F 40/40* (2020.01); *G06N 5/045* (2013.01); *G06N 20/00* (2019.01)

(58) Field of Classification Search
CPC .......................... G06Q 30/0201; G06Q 30/02
See application file for complete search history.

(56) References Cited

U.S. PATENT DOCUMENTS

| | | | | |
|---|---|---|---|---|
| 8,913,152 B1 * | 12/2014 | Carceroni | ............... | G06T 11/60 |
| | | | | 348/222.1 |
| 2008/0292196 A1 * | 11/2008 | Jain | ........................ | G06F 16/58 |
| | | | | 382/225 |

(Continued)

FOREIGN PATENT DOCUMENTS

| | | | | |
|---|---|---|---|---|
| WO | WO-2010078629 A1 * | 7/2010 | ....... | G06F 17/30781 |
| WO | WO-2018058090 A1 * | 3/2018 | | |

OTHER PUBLICATIONS

Ji, Z., Pang, Y., & Li, X. (2015). Relevance preserving projection and ranking for web image search reranking. IEEE Transactions on Image Processing, 24(11), 4137-47. (Year: 2015).*

*Primary Examiner* — William S Brockington, III
(74) *Attorney, Agent, or Firm* — Clark Hill PLC; James R. Foley

(57) ABSTRACT

This invention is directed toward a system which can "step into the shoes" of a user and learn the perspective of that user, regarding photographs or other content, to the point where the system can learn, using criteria it has developed through its interaction with the user, to select photographs it predicts the user will find meaningful from large sets of photographs. The "meaningfulness" of various content from a multitude of users is a constantly improving system made up of four basic elements: a General Content Perspective, an Individual Content Perspective, a Natural Language Generation and Content Presentation, and a Hypersphere element.

20 Claims, 10 Drawing Sheets

(56) References Cited

U.S. PATENT DOCUMENTS

| | | | | |
|---|---|---|---|---|
| 2010/0122286 | A1* | 5/2010 | Begeja | G06Q 30/02 |
| | | | | 725/34 |
| 2011/0129159 | A1* | 6/2011 | Cifarelli | G06F 16/287 |
| | | | | 382/284 |
| 2011/0238503 | A1* | 9/2011 | Naini | G06Q 30/02 |
| | | | | 705/14.66 |
| 2012/0269425 | A1* | 10/2012 | Marchesotti | G06N 20/00 |
| | | | | 382/162 |
| 2013/0290339 | A1* | 10/2013 | LuVogt | G06F 16/9535 |
| | | | | 707/E17.089 |
| 2014/0013213 | A1* | 1/2014 | Kajiwara | G06F 40/106 |
| | | | | 715/243 |
| 2014/0169644 | A1* | 6/2014 | Dockhorn | G06V 40/16 |
| | | | | 382/118 |
| 2014/0337348 | A1* | 11/2014 | Wu | H04N 1/6013 |
| | | | | 707/740 |
| 2015/0286898 | A1* | 10/2015 | Di | G06F 16/60 |
| | | | | 382/224 |
| 2017/0352083 | A1* | 12/2017 | Ruck | G06N 5/022 |
| 2019/0042171 | A1* | 2/2019 | Frieder | G06F 16/55 |
| 2019/0392330 | A1* | 12/2019 | Martineau | G06N 5/04 |

\* cited by examiner

IDENTIFICATION AND REMOVAL OF DUPLICATE AND NEAR DUPLICATE IMAGES FLOW

HYPERSPHERE VOLUMETRIC ANALYSIS

FIG. 5 COMPOSITION ANALYSIS SYSTEM FLOW

SYSTEM FLOW WITH MEDIA

GENERAL CONTENT PERCEPTION AND SELECTION SYSTEM

CROSS REFERENCE TO RELATED APPLICATIONS

This application claims priority back to U.S. Provisional No. 62/745,428 with a filing date of 14 Oct. 2018, the contents of which are incorporate by reference into this application.

STATEMENT REGARDING FEDERALLY SPONSORED RESEARCH OR DEVELOPMENT

This invention was not federally sponsored.

BACKGROUND OF THE INVENTION

Field of the invention: This invention relates to the general field of systems for learning the user perspective regarding the meaningfulness of various content from a multitude of people, and more specifically, to a system that analyzes the individual user perspective of images, such as, in a preferred embodiment, the perspective of a user regarding photographic images created by the users and constantly refines its understanding of the user perspective to provide users with an ever-improving selection process by which a user is advised on which photographs the user is likely to find meaningful and desire to preserve, use and/or enhance to further increase their meaningfulness. The invention has several possible criteria, including the motivations of the users, the personal preferences of users, the personal aesthetic of users, the criteria being used in photography contests, the criteria used when selecting photos for commercial applications, etc.

This invention uses the terms "learning the user perspective" and "meaningfulness" because those terms best map to what the system is doing, that is, it is learning what is meaningful from the user's perspective which spans liking or preference, the deeper themes of motivation which can affect liking and preference but are distinct and include subjective user views on content/image qualities such as content that is needed in order for an image to be considered meaningful like the presence of people, which may be a preference but can also be an expression of a foundational motivation, e.g. social cooperation, that is not a conscious preference of the user but rather a compelling force linked to the underlying, unconscious emotional need to foster and seek belonging. Personalizing content and/or curating images on behalf of a person is a difficult problem to tackle because the cognitive processes involved are too complex to faithfully reproduce and therefore the outputs of these processes cannot be reproduced precisely with absolute confidence. However, the invention can model the core parts of the how a user perceives content by combining non-similar models in a system and method that allows the models to affect each other in a way that imitates layered learning in the brain, learns from the complex interplay of personally meaningful preferences of a human being and produces similar outputs to the more complex human cognitive processes.

For instance, the invention imitates how new information can be introduced that alters the perspective of the individual on isolated dimensions. When this occurs, the analysis of the same intellectual/visual curation problem, once and then once again after considering the new info, would yield different results. The invention also allows new information to alter the models of individual perspectives which changes the prediction outcomes of future analysis. In this way, the invention is more flexible to the ever-changing perspectives, preferences and behaviors of an invention user in a way that models visual perspective understanding to create more precise and more accurate results over prior art. Prior art, also recognizing these limitations and hurdles, have chosen to approach the problem using image to image comparison where the objective qualities of an image are measured or assumed and compared to other images or preferred values, so the images can be ranked.

Prior art is flawed in many ways but primarily it is flawed in its attempt to solve the content personalization/image curation problem by abstracting the qualities of the content/image instead of, as in the invention, abstracting the way a person perceives content and images and transforming this understanding into a system capable of personalizing/curating content and images. Furthermore, the invention recognizes and solves for the problem of system user perspective fluidity, i.e. the human tendency to make different decisions regarding similar content based on context and small situational details. Prior art doesn't account for this fact of human behavior and therefore produces poor quality results applying the same personalization/content selection logic ubiquitously across various contextually different situations.

To add clarity to the invention abstraction process, prior art has approached the problem as one that can be solved by trying to model(abstract) the qualities of content in an objective way and then comparing those results with the model/abstract of another piece of content or an idealized model of the content qualities or both. The invention improves on prior art by realizing that prior art was starting and focusing the abstraction/modelling process on the wrong component of the problem space. The invention focuses on improving the system's understanding of the user perspective using the user's own content as a guide at the beginning of the process by modeling what we believe are the best and most predictive subjective visual perspectives of an individual before attempting to evaluate the content itself.

Then, we move onto the processes where prior art begins, i.e. modelling/abstracting the qualities of content. Because we have the critical human perspective modelling step in our invention prior to modeling/abstracting the qualities of content in an objective way, we are able to significantly improve the accuracy of those objective content qualities abstractions/models/predictions in reference to how the invention end user would see the same analysis problem. Also, the invention can then directly produce various predictions about subjective content qualities that prior art must explicitly ask about to obtain any data for analysis. Our invention, uniquely, generates its own accurate prediction data about subjective perspectives during content analysis and selection.

In short, the novelty and advantage of our invention is that we realized abstracting the visual perspective of an individual, instead of the aesthetic qualities of a piece of content, allows the system to produce more varied, more accurate and precise content meaningfulness selections. We transformed the outcomes of the system by transforming the process into one that starts and projects from a more advantageous position in the problem space.

The invention solves for system user perspective fluidity by recognizing that context is a catalyst for triggering different motivational responses from system users. In turn, based on the mix of core motivations, different behavioral patterns and decision biases emerge in system users that are aligned to the underlying unconscious motivational factors.

Therefore, when a user is considering a piece of content/image how they perceive the image details/qualities is directly affected by the unconscious motivationally driven behavior patterns and biases.

That means, what a user consciously likes, wants, prefers or finds meaningful changes based on context, motivation and then the details of the content/image in question in addition to the conscious preferences of the system user. The invention includes this sequence of cause and effect in its analysis flow. This understanding of the core elements that drive personalization and content curation decision making allow the invention to drastically improve on the outputs of prior art by mimicking not the whole human cognitive process but rather just the most important parts of the cognitive processes behind content personalization and the flow of dependent events, inputs and outputs.

To further illustrate how the invention transforms data about visual media and user perspectives into an autonomous selection system by mimicking only the most important cognitive elements behind content personalization, it is important to note that the invention learns to identify what motivational, emotional, subject matter and visual qualities an individual finds meaningful, then expands its baseline understanding of how those meaningful qualities are visually expressed in content on an individual quality level by introducing the individual user's subjective perspective on those meaningful visual expressions. The invention then uses the combination of those understandings to analyze content for meaningful qualities and predict the strength of those qualities. In this way, the system can assume the perspective of the user using the most influential building blocks of the user's visual perspective on content personalization to guide the predictive performance of the selection invention. This method of the invention is more flexible to serve more individuals accurately than prior art and more efficient by reducing the solution variables to the most influential and predictive perspective dimensions.

Additionally, a preferred embodiment of the system is Machine Learning based and learns partially through non-directed pattern recognition. This non-biased observation of system user behavior patterns gives the system the ability, when coupled with the plurality of data dimensions we've specifically chosen to model, to recognize meaningful content/images on behalf of a user where the factors involved in choosing the right piece of content might not be recognizable or obvious to human system designers.

In some cases, using a special time function that mimics human memory progression, the system can identify a small set of meaningful images, out of a large set, that might not be preferred in the moment by a user but will be significantly meaningful to them at some point in the future. This ability to consider and act on the effect time has on the perception of meaningfulness is a key benefit that is not supported in prior art.

The system, which has several possible embodiments in a number of different fields, is capable of learning an individual's perspective on a variety of content and using that understanding to curate content for the user in proxy. Possible uses of the system include identifying the most meaningful images from a large set, curating and making archive, preservation, inclusion/exclusion recommendations, analyzing photos from the user's aesthetic perspective and making enhancement/improvement tips and matching users with content unknown to them across a wide variety of subjective influenced criteria and objective standards/best practices. The system can create these benefits for an individual system user or company concerning personal photography, personal video, personal music, general photography, general video, general music, brand aligned images, contest photography, contest video, consumer advertising images, educational images and behavior/mood image-based therapies. The system is also able to learn the collective perspective of a group of people and perform the same beneficial tasks to produce the same benefits. For example, an advertising agency might collectively use the system under one account and the system would learn the combined collective subjective perspective of the various users using the same account to help curate advertising images and find ones that are meaningful or aligned to the collective subjective view of the agency instead of an individual person.

BRIEF DESCRIPTION OF INVENTION

For sake of simplicity, a basic version of the invention will be described. In this case, a person who likes to take photographs will use the system to try to select his/her "most meaningful" photographs based on his/her own input into the system. Although one of the preferred embodiments of the invention is used for purposes of illustration, this in no way intends to limit the breadth of this patent application or the various possible embodiments of the invention in the various fields in which it can be used.

In this preferred embodiment, a user of the invention interfaces with the system so that the system can learn about the user perspective regarding content/images/photography through a variety of processes including a) explicit learning where the system is asking the user about objective and subjective qualities to learn their perspective directly from the user and discern what is motivating the user perspectives, behaviors and preferences by matching them to archetype motivational personas with motivationally matched core behaviors, preferences and biases designed into the baseline system; and b) implicit learning where the system analyzes the user content, behavior (and changes in both) for patterns to infer learnings about the user's perspective on objective and subjective qualities, their individual motivations and preferences across a variety of dimensions. This second set of learnings allow the archetype motivational persona driving the system AI to be transformed into an AI that is unique to the individual system user.

To elaborate on this transformational moment that allows the invention to produce outputs not possible with prior art, the subjective learnings in the individual system user AI act as a lens or how a color overlay would change the perception of a scene by a human viewer. The subjective learnings in the individual system user AI directly influence the way all future content is perceived by the invention. In the case of the invention, the lens like distortion of the scene/content is intentional and correctional. The distortion or shaping of the system perception represents the particular visual perspectives, behaviors, biases and content preferences of the individual user. The way in which these learnings are collected and recorded is in and of itself novel in the way that it represents the objectively subjective and objective visual perspectives of an individual user. However, the method of applying these subjective learnings in the invention creates unique benefits for invention users including improved accuracy and precision of content meaningfulness selections.

To accomplish this image analysis task from the user's perspective in a precise way, the system uses a many dimension hyperspace volumetric analysis that makes predictions of the user's perspective, first across universal/objective dimensions, then, second, across subjective dimensions that are normalized into a value that can be plotted in a hyperspace volume.

This normalized data is then plotted relative to an idealized, personal center, the nexus of meaningfulness, one for each user of the invention, which represents that user's perspective on the ideal state of meaningfulness for that type of content, e.g. photos. The system then creates a hypersphere boundary at a distance from the idealized personal center. The hyperspace locations inside the hypersphere volume represent locations that are near enough to the idealized, personal center that they are recognized as having a high probability of being highly meaningful to the individual. The relative distance from the center of the hypersphere is therefore how meaningful the system predicts the user will perceive the given content.

The system recognizes that the distance in time from content/image/photograph creation affects how meaningful the user of the invention perceives the content/image/photography to be. To reflect this understanding in the system operations, the system is always recalculating the location of the ideal personalized center in reference to real world time. This means, unlike existing systems, the invention never analyses an image the same way twice because the location of the idealized, personal center is always moving according the time function and its location is the basis for analysis. Further, the effect time has on the perception of meaningfulness in a system user is not linear. The system uses a modified inverted bell curve to reflect how the meaningfulness of an image increases, wanes and then increases again over time.

Next, a user of the invention provides a variety of photographs, into a "personalization funnel", which relies on implicit learning to find certain pattern, quality and quality strength trends in the visual content such as photographs that the person finds meaningful. The system analyzes the photographs creating predictions of the user's perspective regarding the photograph. In one implementation, the system analyzes the content first across subjective dimensions, then, second, static dimensions, then, third, machine learning dimensions, and finally, algorithmic dimensions to produce normalized data describing what the system predicts the user's perspective would be across all the dimensions so that the data can also be plotted into the hyperspace volume for analysis. Once this plotting in hyperspace happens for a set of photographs that have been analyzed by the system, all the individual asset locations can be compared to the location of ideal personalized center and the location of the boundary of the hypersphere.

The individualized asset is then filtered through a Magnitude filter, which creates a vector from the plot of the asset to the idealized center and measures the magnitude of the vector to determine if it falls within the hypersphere. This generates data that explains dimension and magnitude relationships through natural language generation. The step of generating the dimension and magnitude relationship also received input from the personalization funnel. The results from this data management and analytical process are passed on to the user in a context which allows the user to interact with the data and provide feedback via input via the keyboard and mouse, through interactions and buttons that can be activated by the user to register feedback on individual and groups of photos.

In a preferred embodiment, users have the ability to comment on the system's natural language feedback to the user concerning the decision logic, as well as providing feedback, which provide the ability for users to remove photos from the top photos or most meaningful photos and to make choices in the image enhancement module where the system suggests ways to enhance photos to make them better photos. This feedback happens through direct user input via the keyboard and mouse, through touchscreen interactions and/or buttons that can be activated by the user through various mechanisms to register feedback on individual and groups of photos.

As noted, in a separate part of the invention that is preferred but not required for the system to work and produce benefits, a user of the invention provides his/her pictures to an explicit learning component of the system, which provides continuous learning and improvement to the selection assessment system. These results can be transmitted to continuously train a universal model, a persona model, and an individual model. Each of these models can be further improved through the input of the context of each component. The initial invention relied on the user to choose arbitrary photos or images for submission during explicit learning, we've now modified the photo submission explicit learning step to include a prompt to a self-identified photo of themselves from their photo library, selfie or other, that further improves the system's ability to accurately predict subject matter relationships and importance.

Time has a special function in the system and is constantly altering the user perspective models based on a modified inverted bell curve where very recent images/events identified in images are judged as probably more meaningful to a person than images/events slightly farther away in time with a reversal as images/events identified in images get farther away in time where, over a long period of time, images/events identified in images are judged as probably even more meaningful than recent events once they reach a specified threshold of distance in the past. These improvements are constantly subject to improvement as the user's feedback is transmitted back to the system in the form of an explicit and continuous feedback loop.

The basic goal of this system is to help a person identify and use the most meaningful photos out of a large set. It accomplishes this task by using computer software and continuous feedback to allow the computer to learn an individual's subjective perspective regarding photos, then use that understanding of the individual's subjective perspective to suggest to the user photos he or she may find meaningful and worthy of preservation, use or enhancement. The possible uses of the invention range from helping a hobbyist photographer to select from a weeklong trip's worth of photos a few that the system predicts will be the user's favorites, to helping professional photographers enter photos most like to win photography contests based on the criteria the contest has used in the past to pick winning photographs; to automating the process of mobile phone photo library curation and selection for processes like printing, sharing and archiving.

The prior art has several examples of attempts to resolve this problem. For example, Canadian Patent Application 2 626 323 to Hale, et. al, teaches a method of automatically tagging photo images. While tagging of photo images is helpful, it does not address the benefit of making automated selections for users of the invention based on the system learning an individual's preferences. U.S. Pat. No. 7,924,473 to Fuji Film uses an image evaluation process to judge the printing status of a particular photograph, with an "evaluation value" being assigned to the photograph. This system does not provide the "system learning" by which the systems steps into the shoes of the user and "selects" for the user photographs the user is likely to find meaningful.

U.S. Pat. No. 8,531,551 to Huberman, et. al. provides a system and method for image sharing. This patent, however, does not provide the continuous-loop feedback that allows the current invention to improve itself over time. It also assumes that photographs within a "set" of photographs are to be transmitted and analyzed. Another U.S. Pat. No. 8,634,646 to Herraiz, et. al. teaches yet another method of selecting and recommending photograph though attaching various tags and scores to photographs. This patent fails to improve upon itself, or to actually take on the role of actively selecting photographs that the system believes the user will like. U.S. Pat. No. 8,873,851 to Federovskaya, et. al. lays out a system for selecting "high-interest-level images". This system requires the use of a digital camera that captures images of various people viewing an image, and then assessing an "interest level" to certain images for certain people. While this system may be able to accurately assess a person's interest in a particular photograph, it does not provide the feedback that the current invention provides to constantly improve its accuracy to the point with the current system can actually go into a batch of photographs and select optimum ones for the user of the invention.

IBM also got into the photo selection business with U.S. Pat. No. 8,925,060 to Chakra, et. al. This method uses a cloud computing system to identify a certain criterion and determine whether that criteria is authorized for transmission to storage in the cloud. This patent does not provide a solution related to photograph preference and machine learning. Another patent dealing with photograph selection is U.S. Pat. No. 9,268,792 to Morrison, et. al. This patent uses weighted criteria to select an image from a group of images. As with the rest of the prior art, while this patent may assist in selecting an image that a particular user may find attractive, it does not use machine learning to select photos as though it was the person, and does not have the feedback loop function to constantly improve itself.

A final piece of prior art is US Publication No. 2015/0213110 to Kazunaori Araki. This publication discusses the use of software to calculate scores, including scores associated with pictures. The method taught by the Kazunaori publication does not allow the user to benefit from the system getting to know him/her well enough to suggest photographs to him/her, but rather just abstracts measurable quantities of an image and user behavior.

Thus there has existed a long-felt need for a system that can learn what a user finds meaningful to the point where the system can accurately predict which media a user will find meaningful, or, in this preferred embodiment of the invention, the system will predict which photographs a user will find meaningful from a set of photographs entered into the system.

The current invention provides just such a solution by having a system which learns an individual's perspective on photographs, through a variety of inquiries and observations, for example through question and image surveys. Machine learning is then used in a number of ways to enhance the ability of the system to anticipate a user's perspective and what they find meaningful. The current invention creates benefits not seen in prior art including a) producing higher quality content personalization and image curation results, this is possible in part by predicting the subjective user perspective on content as opposed to trying to measure or infer the objective qualities of an image and then comparing those qualities to other images to rank them and in part because the invention abstracts the cognitive process of image perception instead of abstracting image qualities.

By moving the abstraction from the content/image level to the cognitive process layer of the problem space, superior results are achievable because nuances of human decision making, e.g. the sequence of events where context affects motivation, can be built into the process improving the fidelity and effectiveness of the system b) producing benefits in a broader set of applications and situations, this is possible in part because the system analysis has motivational bias baselines that change based on context detected in the content being analyzed and also because the criteria the invention uses can be changed to a bespoke set of criteria that is more applicable to a certain type of content.

That is, prior art systems are focused on silos of content because they focus on abstracting qualities of the content and those abstractions are not applicable in disparate situations whereas the current invention does not have this limitation as it can be applied to many different content personalization and curation tasks c) producing more precise results in situations where there are many individual assets or pieces of content to be analyzed because the system self improves and is better at meaningfulness analysis each time and because the hypersphere allows subtle differences in motivationally significant dimension values to impact overall system results and push images into the boundary of meaningfulness whereas the difference might go unnoticed in prior art d) producing more concise results through the removal of duplicate and near duplicate images from final selection sets e) the learnings from one user can automatically be conveyed to other users of the same type to improve the overall system in addition to the individual system amplifying the impact of continuous learning to produce better and better results overtime.

The system has continuous learning and improvement from multiple feedback sub-systems, allowing the system to constantly improve its predictive abilities with each user. In a clear improvement on prior art, the invention feedback sub-systems not only improve the predictive abilities of the system for an individual user, but also many general learnings about people, their behavior and preferences in refence to their motivations are fed back into the archetype AI personas improving the predictive abilities for all individuals as the system is used by more people.

A "personalization funnel" takes in all the content and predictive components, including a universal model, a persona model and an individual model, and, through implicit and explicit learning, generates an ever-improving predictive model. From the personalization funnel, the data goes through a de-duplication process by which duplicate and near-duplicate images are identified, with only the best image(s), with lesser quality near duplicates removed, selected for presentation to the user.

The original invention relied on a de-duplication system focused on removing duplicates and identifying near duplicates to find the aesthetically best photo of the bunch, the invention has been modified to allow the personalization funnel to more directly impact similarity analysis and amplify the personalization funnel effect. The subjective perspective effect of the personalization funnel is of critical importance when detecting the most meaningful photo/piece of content from a set of near duplicates because the capture of multiple pieces of content that is highly similar, especially in close succession, is often an indicator of subjective preference for the features of that media, so user intent of subjective preference can be inferred and used to apply positive weight to the evaluation of those dimensions of user content in that and future analysis of other content.

Likewise, media content that is similar but not duplicate or part of a near-duplicate series implies subjective perspective of the user and can be used by the invention to adjust system predictive parameters, such as weight adjustments for rewards and penalties to the individual dimensions which contain such similarities across content during current and future analysis.

The personalization funnel can influence each, individual dimension evaluated thereafter, from other machine-learning dimensions which include, for example, the de-duplication process, to algorithmic dimensions which take as an input those personalization tensors. It even influences the evaluation of static dimensions through the following process of dimension normalization. This uses basic linear transformations such as stretch and scale, as well as flattens and connects axis gaps for the more complex dimensions so that all dimensions are comparable to each other for plotting assets across all dimensions later. The personalization influence of this normalization can be taught with its own weights and biases through implicit and explicit training of the system, allowing for intricate, nuanced interactions across dimensions for personal meaningfulness.

The de-duplication function serves to limit the selection of duplicate and near-duplicate images, so that the results are more concise and of higher value to the system user. For example, in the preferred embodiment illustrated here, a viewer will benefit more from his/her "best/most meaningful" pictures of a particular object from a series—as assessed by the system—rather than being presented with a number of identical or nearly identical images. In other embodiments of the invention, the de-duplication and series identification functions are coupled with additional layers of image identification to remove memes and like images that are commonly found on user smartphone and computer devices in large number but interfere with automated selection systems and methods by unnecessarily increasing the total set of images to be automatically analyzed and diluting the benefits of the automated image selection systems when these meme images make it into final results because they are confused for system user generated content/images.

Along with the de-duplication process, the data from the personalization funnel goes through analysis in the form of static and other machine-learning dimensions, and algorithmic dimensions, to create normalized data across attributes like the subjective aesthetics, the subjects of the content, the mood, or the composition of the content. This entails the generation of single values equaling a plottable location in the system's volumetric hyperspace analysis such that a single point can be plotted (x:1, y:2, z:3, . . . n:1.6). A nexus of meaningfulness, or idealized personal center represents the relative center of the volumetric analysis. A magnitude filter compares the location of all the individual assets to the hypersphere boundary to remove those images/set from the final selection set.

The invention originally relied on a static hypersphere boundary, the boundary definition aspect of the system has been modified to include a user interaction that changes the hypersphere boundary location after input from the user that tells the system to expand or contract the volume of the hypersphere. This user interaction can take many forms including but not limited to choosing a percentage of total content, a maximum number of content assets or an incremental input that allows the user to slowly expand and reduce the hypersphere volume. Additionally, the invention now allows for finding the center of the intersection of two or more hyperspheres to allow for filtering or combining multiple users together within the same space.

After the final set of images/assets have been selected, the system generates an explanation in natural language for why it predicted that the final set of images are the most meaningful. This feedback to the user is novel in that prior art based on Machine Learning is mostly a black box process where the logic of the system decisions is hidden or not understandable by system creators of users. The current invention provides a superior product in that it can now give direct feedback to user regarding the images qualitative and quantitative meaningful properties. The system can then present an optimized set of images to the user along with natural language feedback so that the user can review the feedback and provide their own counter feedback on the images proposed to him/her by the system.

There has thus been outlined, rather broadly, the more important features of the invention in order that the detailed description thereof may be better understood, and in order that the present contribution to the art may be better appreciated. There are additional features of the invention that will be described hereinafter, and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims we regard as our invention.

BRIEF DESCRIPTION OF THE FIGURES

One preferred form of the invention will now be described with reference to the accompanying drawings.

DETAILED DESCRIPTION OF THE FIGURES

Figure 1:
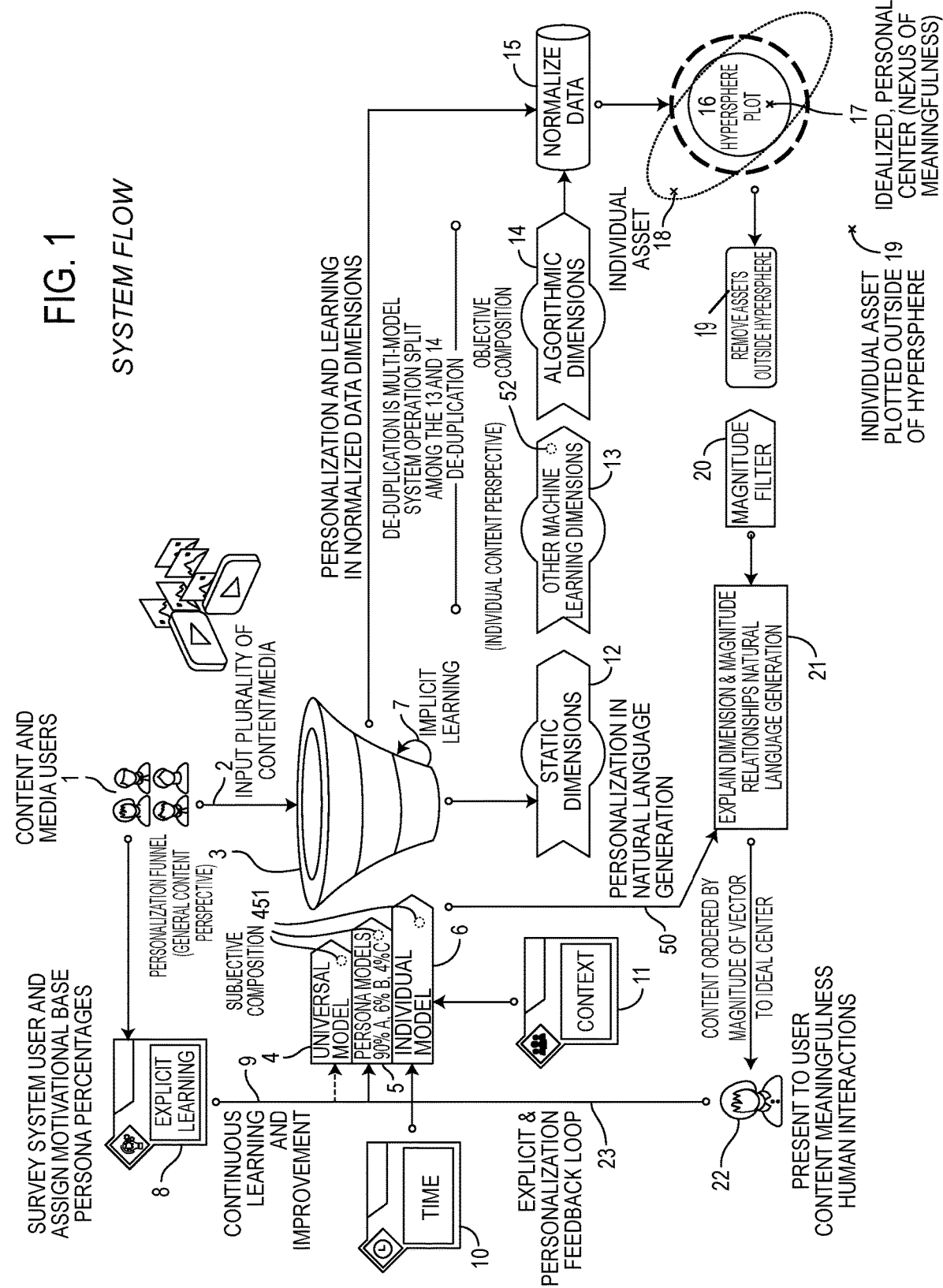
FIG. 1 is a work flow diagram showing the basic components of the system with a brief description of each component and its function.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

The system comprises four basic elements, as illustrated in FIG. 11: A General Content Perspective (800), an Individual Content Perspective (801), a Personalized Content Presentation & User Feedback (802), and a Hypersphere Analysis (802). The details of each of the four basic elements along with their interaction with each other is detailed below in several embodiments.

Figure 10:
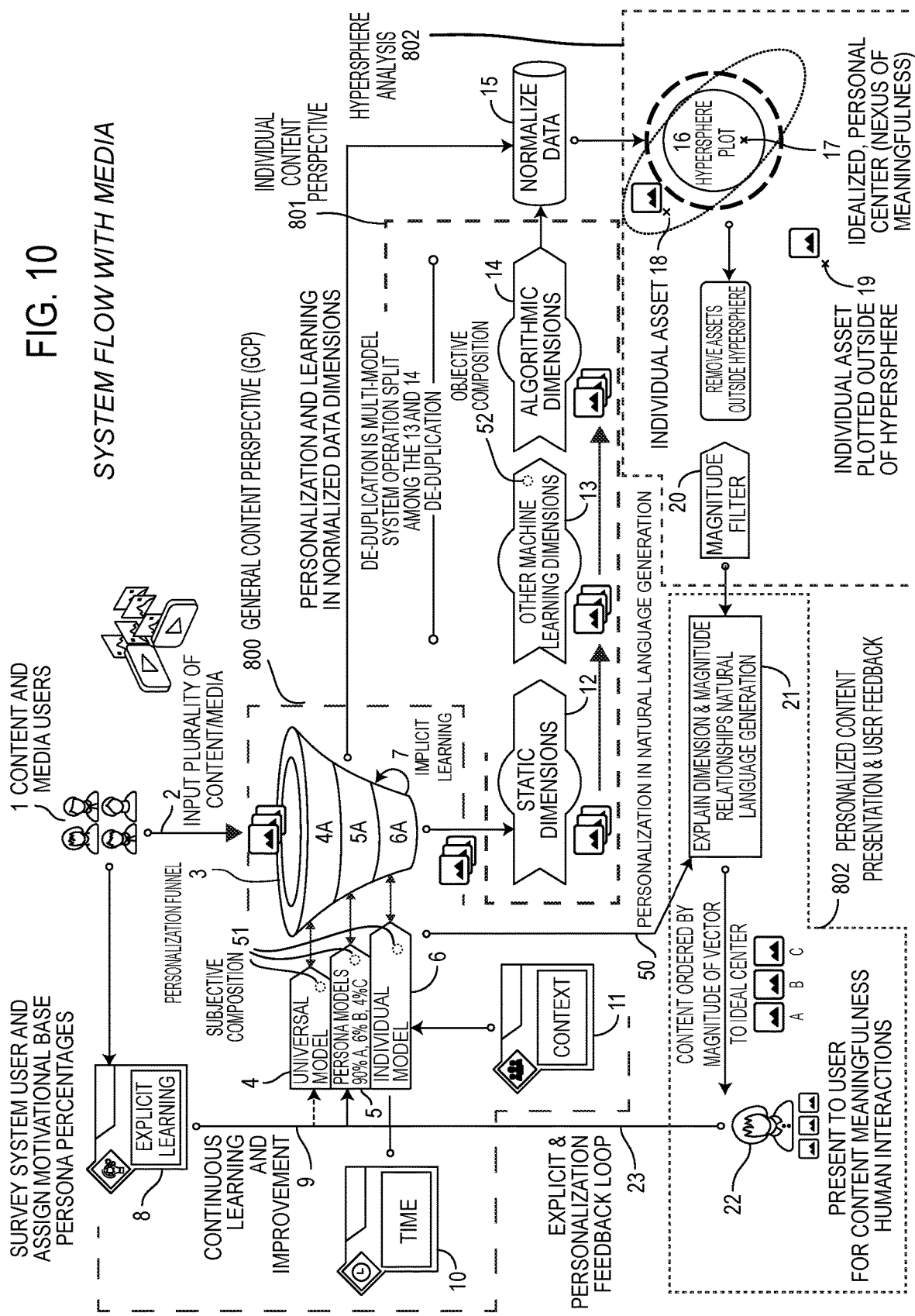
FIG. 10 is a system flow of an embodiment similar to the one illustrated in FIG. 1.

FIG. 1 is a work flow diagram showing the basic components of the system with a brief description of each component and its function. FIG. 10 is a system flow of an embodiment similar to the one illustrated in FIG. 1. Both Figures will be discussed in this section. The system comprises four basic elements as is clearly detailed in FIG. 10: A General Content Perspective (800), an Individual Content Perspective (801), a Personalized Content Presentation & User Feedback (802), and a Hypersphere Analysis (802). The details of each of the four basic elements along with their interaction with each other is detailed below.

The system begins with the Content and Media Users (1) In a preferred embodiment, the system user is a person who has photos they have personally taken stored on a computer device, however, the "content and media users" (1) could be a variety of people, groups or institutions.

The first part of the system involves a Motivational Perspective Survey: System, which surveys users with a series of behavioral questions to explicitly learn about the user, their behavior and motivations. For the example of photo selection, these surveys could cover whether the person prefers landscapes or portraits, color or black and white, etc. The answers to the survey allow the system to determine what mix of system base motivational personas to assign the individual user. E.g. the user's responses might indicate that the user aligns 90% to the Soccer Mom persona, 6% to the Social Snapper and 4% to the Passive Photog. Each persona has a baseline behavior, preference and aesthetic tendency which affects the system probability modelling and decision making. Note: this step can also be accomplished by the system analyzing the user's photo collection to infer their personality/motivational persona mix instead of a survey to make the determination of persona mix via (07) Implicit Learning). This survey establishes the learnings in (05) the Persona Models.

The Implicit Learning element (07) improves system performance in a variety of ways, in addition to allowing the system to function without explicit learning. One of which, I will be using as an example in this Utility patent. Through Implicit Learning (07) in the Personalization Funnel (03) the invention uses new content coming into the system to improve the overall system's ability to analyze new content for specific subjective meaningfulness before the new content in question is analyzed itself. The content of the implicit learning element cross-transmits information with the Subjective Composition element (51), such that the Universal Model (4) communicates with the upper level (4A) of the Personalization Funnel (03), the Persona Models (5) interact with the middle level (5A) of the Personalization Funnel (03) and the Individual Model (6) cross-communicates with the bottom level of the Personalization Funnel (03). This method of improving the system's understanding of the invention user's generalized subjective perspective (03) through ongoing feedback and improvement, and therefore performance with content (02) the system will later analyze for specific meaningfulness, including a static dimensions element (12), another machine learning dimensions element (13) and an algorithmic dimensions element (14), that is not seen in prior art and provides a significant improvement over the existing technology.

To illustrate, when the (02) Input Plurality of Content Media event occurs and the content first interacts with system components in the Personalization Funnel (03), the images are analyzed but not to produce meaningfulness predictions about the content being evaluated. Rather, the system first analyzes the content with the Personalization Funnel (03) models to look for patterns, concepts, motivational connections and meaningful subject matter, et al, in a reinforcement process to inform the Personalization Funnel models themselves through the Implicit Learning (07). As an example of how the system uses Implicit Learning (07) to improve automated selection of content in a way that prior art fails to achieve, we start with a collection of photos being analyzed for meaningfulness in the preferred embodiment. For this example, when the (02) Input Plurality of Content Media event occurs, the Personalization Funnel (03), which houses the system user's General Content Perspective models, receives input that includes a high percentage of photos with children in them, a majority that include images from soccer games with children and multiple but not a majority that include a new repeated face.

The Implicit Learning (07) system of the invention will recognize these qualities and update the Personalization Funnel(03) models to improve the system's understanding of the user's General Content Perspective by reinforcing the concepts of children, the system user's own children, soccer, fields, action, cheerful moods, social cooperation and outdoor lighting, that are already embedded in the example system user's Individual Models (06), through prior explicit and implicit learning, and their base Persona Model (Soccer Mom). The Implicit Learning in this example updates the Subjective Composition element (451), which includes Subjective Composition element (451), which, in turn, comprises the Universal Model (4), which communicates with the upper level (4A) of the Personalization Funnel (03), the Persona Models (5), which interact with the middle level (5A) of the Personalization Funnel (03) and the Individual Model (6) cross-communicates with the bottom level of the Personalization Funnel (03) with the corresponding relative strength of reinforcement to incorporate the distribution of the qualities in the content set being currently evaluated.

This Implicit Learning (07) process then improves the Personalization Models before the (02) Input Plurality of Content Media is examined for meaningfulness in the Personalization influenced processes a static dimensions element (12), another machine learning dimensions element (13) and an algorithmic dimensions element (14). The invention improves over prior art by using new content in a novel way to improve the selection of content downstream in the invention.

The original invention relied on a sequence of behavioral survey questions and now the system has been modified to also include quick set-up modes that allow the system user to choose a photograph from a set whose qualities imply many of the answers to the behavioral survey questions. This allows the user to be assigned to a base persona sooner and more efficiently.

Part 2—Individual Perspective Image Survey: System surveys user using a series of images to collect subjective perspective data to explicitly learn about the user, their personal perspective on aesthetics, content, mood, composition and sub-qualities selected by the persona representatives. These learnings about the individual subjective perspective work as an overlay to the base persona and universal photo learnings and transform the workings of the system from a system capable of making predictions based on known general preferences and motivational biases to a system capable of making predictions based on the specific subjective tendencies influence by broad motivational biases. This survey establishes the learnings in the Individual Model (06) and continues to be available at any time for system users who wish to continue to interact with the explicit learning mechanism.

Continuous Learning and Improvement (9) As soon as the explicit learning (8) is complete, the system enters a state of continuous learning and improvement where it takes in data and learnings from multiple feedback points to improve itself via improvement of the superset of novel models representing of the system user perspective. It should be noted that the system can work without the (8 Explicit Learning) and go right into Continuous Learning and Improvement (9) element to learn about the user perspective from use of the system instead of direct inquiry or survey of the user.

At the end of the first cycles of Continuous Learning and Improvement (09) a new instance of the system AI is established using the universal model, base persona model and individual perspective learnings to form a system comprising a superset of novel models, i.e. the Personalization Funnel (03) or General Content Perspective system, that thereafter is representing of the system user perspective. This new instance of the invention AI is a unique system where learnings about one individual are embedded and unlike any other instance as soon as the individual perspective learnings are overlaid on the base persona mix. This is the system that is now ready for content analysis from the user's perspective and continuous improvement.

Time(10) Time has a special function in the system and is constantly altering the user perspective models based on a modified inverted bell curve where very recent images/events identified in images are judged as probably more meaningful to a person than images/events slightly farther away in time with a reversal as images/events identified in images get farther away in time where, over a long period of time, images/events identified in images are judged as probably even more meaningful than recent events once they reach a specified threshold of distance in the past. The original invention relied on Time to help shape the system's prediction of how meaningful content will be throughout time. The invention has been modified so that as individual personalized models evolve over time through learning, the system can also follow trends in personal preference to predict how a user's subjective analysis will continue to change in the future as well even if the user has not contributed new data to the system for a period of time to help the system learn.

Context(11) The context detected in images or explicitly requested or tagged by system users is also part of the continuous learning loop as the system uses the context identified in images to alter the expression of behavioral and preference biases in the models. That is, if a birthday party of a child known to the user is detected in the image content, that context will enhance the probability of meaningfulness to system users aligned most strongly with the Soccer Mom base motivational persona. In addition, personalization can be influenced directly by context, providing both filtering and fundamentally different (15) Normalized Data) based upon contextual preference. That is, asking for the best photos for a photobook of a wedding for grandma fundamentally shifts the personalization favoring photos better printed vs. digital, filtered by the wedding, and taking into account grandma's preferences as learned from the system user.

The system, using the models in Universal Model (04), Persona Models (05) and Individual Models (06) as a base to represent the user perspective, is now ready to analyze images and select the most meaningful images in proxy for the user.

Input Plurality of Content/Media (02)) Load Image into Computer Vision System Apparatus-Images are now uploaded or input into the system. In a preferred embodiment, a plurality of images in the hundreds or thousands is input into the system. Additional images can be added one by one through a camera function of the preferred embodiment or uploaded as single images or in batch after the initial library is imported.

The system uses the models in the Personalization Funnel (03) containing the models Universal Model (04), Persona Models (05) and Individual Model (06), and machine learning, image metadata, computer vision and algorithmic processes to make probabilistic predictions about the images across a plurality of dimensions including the reference dimensions in Universal Model (04), Persona Models (05) and Individual Model (06) and Static Dimensions (12), Other Machine Learning Dimensions (13), and Algorithmic Dimensions (14). These dimensions and values make up the (Individual Content Perspective). The dimensions include image qualities like the predicted subjective perspective of the user regarding the image, objective measurable dimensions such as time the photo was taken, and content detected in the image.

During Static Dimensions (12), Other Machine Learning Dimensions (13), and Algorithmic Dimensions (14), a multimodal system process for image De-duplication takes place. This novel process uses the mixed model algorithmic and of Machine Learning analysis to determine which images are probably duplicate or near-duplicate so as not to include too many images in the final selection that are images in a series where the image creator, the system user, captures many instances of the same situation.

Once the plurality of dimension values for system user's perspective (General Content Perspective) and plurality of dimension values for the image (Individual Content Perspective) are predicted the two sets of values are independently normalized (15) into separate single values the equaling a plottable location in the systems volumetric hyperspace analysis.

The volumetric analysis is set up with the (General Content Perspective) output represented by (17 Idealized, Personal Center)((the nexus of meaningfulness)) as the center of a hypersphere in many dimensional space, the (Individual Content Perspective) for a single image represented by the (18 Individual Asset) location and a boundary of the hypersphere representing the divide between highly meaningful and less meaningful images-represented by automatic or user selected thresholds.

Magnitude Filter (20) is where the system compares the location of all (18 Individual Assets) to the hypersphere boundary to remove those images/assets (19 Individual Asset Plotted Outside of Hypersphere) from the final selection set.

Explain Dimension and Magnitude Relationships/Natural Language Generation (21). After (20) a final set images/assets have been selected and the system generates an explanation in natural language for why it predicted that the final set of images are the most meaningful. This feedback to the user is significant in that prior art based on Machine Learning is mostly a black box process where the logic of the system decisions is hidden or not understandable by system creators of users. We have made overcome this challenge for many content characteristics and can now give direct feedback to user regarding the images qualitative and quantitative meaningful properties. This is in part possible because the system user perspective embodied in the (04) (05)(06) models is used again in (21) to influence how the system feedback is generated so that it matches the individual user's persona/subjective perspective in tone and content.

Present Final Set of Images and Explanation of System Decisions to User ((22) the system apparatus presents the final set of images and a set of natural language feedback to the user for consumption and interaction.

Explicit and Personalization Feedback Loop (23) User actions concerning the images after the final set of images is presented to the user and feedback regarding the image selection/system explanations is fed back into the system as part of (9 Continuous Learning and Improvement).

After the Present to User for Content Meaningfulness Human Interactions element (22) the system can load more images into system, or system users may continue to interact with the system through explicit learning or contextual input.

Figure 2:
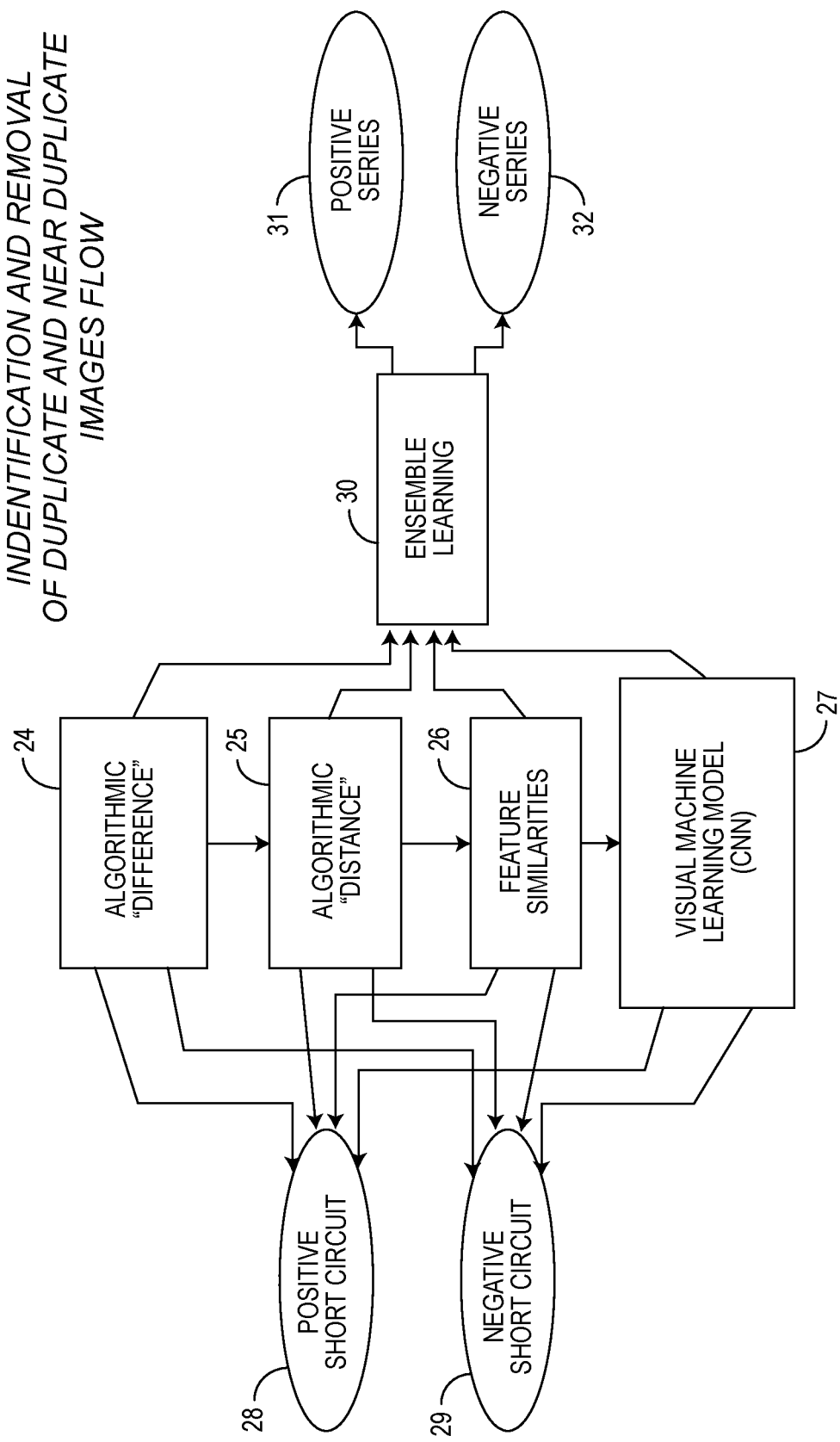
FIG. 2 is another work flow diagram showing the section of the invention that controls the identification and removal of duplicate and near-duplicate images.

FIG. 2 is another work flow diagram showing the section of the invention that controls the identification and removal of duplicate and near-duplicate images. A set of images is put through a number of assessment systems which determine an algorithmic difference 24, an algorithmic distance 25, feature similarities 26, resulting in a visual machine learning model 27. These assessments fit into an ensemble learning 30 component, which directs both a positive series 31 and a negative series 32, and a positive short circuit 28 and a negative short circuit 29.

While pixel difference and pixel distance algorithms are commonly used for photo copyright detection, this system uses them as tools in interpreting machine learning and algorithmic analyses of content. This helps provide guidance for identifying very nearly identical series of photos or just very similar photos that may have substantial overlap in non-exact pixel features for the sake of adding penalties or rewards as appropriate to feature dimension weights.

(24) A section by section analysis of direct pixel differences, a technique frequently used to check for copyright infringement.

(25) "Perceptual" distance, compiling two vectors from both images and computing a perceptual distance. Also, frequently used for copyright infringement detection but is "fuzzier" in the calculation and can detect if two images are close, but there was a sudden lighting change, for example.

(26) Feature Similarities evaluates pictures taken in close succession for a broad range of very similar features. Are the same objects in frame? Same faces identified? The same predominant color palette and is object composition similar?

(27) We also trained and employ (in one form of implementation) a Convolutional Neural Network (CNN) trained specifically on common categories of series photos.

(28) If one model in the pipeline has very strong, positive confidence, we short circuit further processing and return a positive match.

(29) If one model in the pipeline has a very strong, negative confidence, we short circuit further processing and return a negative match.

(30) If no one model had strong positive or negative confidence we combine all of their results into an additional machine learning model designed to make a final decision.

(31) Positive match for an image in the series includes the unique identifier of each, other image detected.

(32) Negative match for an image in the series also includes the unique identifier of each, other image detected.

By way of additional explanation, in this particular embodiment the image de-duplication system employs methods that combine image analysis techniques well known in the art in new and unexpected ways to identify and remove duplicate and near duplicate images from the final selection set. This is crucial to ensure that the automated content/image personalization and curation system doesn't include too many images in the final selection that are the same or almost the same because doing so dilutes the benefits of the system, as is seen in prior art This is especially beneficial in systems intended for use by everyday people in the modern world because it is well known in the art that photo collections created by system users, e.g. the photo library on any smartphone, contain many near duplicate images because:

There is a common tendency to take repeat shots to get just the combination of qualities seeking the perfect picture.

The ease of taking photos with modern cameras and smart phones.

However, the system user does not want ALL of these identical or nearly identical images; only the "best of the bunch/most meaningful".

Prior art systems and the techniques known in the art recognize this problem but provide no systems or methods to solve for the problem except using readable metadata from images and comparing to the metadata of other images to identify duplicates by time of day taken and other objective data recorded in the image files header. Using metadata to solve this problem produces inconsistent and poor results because metadata is not consistent across images, cameras or users and this technique can only identify actual duplicates not near duplicates which are a bigger problem in automated content and image selections fields. The current invention solves this problem by combining known techniques with new techniques of the inventors' design in a multistep, multi approach system that produces benefits unachievable using prior art and techniques. Traditional techniques, like those used to identify copyrighted images using direct pixel comparison and meta data, produce results which do not remove all duplicates and have no ability to detect images in a series which are part of a bigger series taken in close time proximity to each other. The current system is designed to solve the more complex problem of series and near duplicate detection using the traditional techniques as a first analysis layer, to quickly remove images that are easy to identify as duplicates and don't require the heavier computational load of our newly designed techniques.

The next layers of the de-duplication analysis system uses transfer learning techniques and experimentation with the outputs of various Machine Learning models not designed for finding duplicates, including data from object detection ML model processes that are halted at random times to gather image hash data for comparison to the images being analyzed for the presence of duplicates and the use of a Convolutional Neural Network trained on common categories of series photos. The sequenced combination of simple duplicate identification techniques from prior art and the more computationally complex techniques derived from experimentation can identify duplicates and the more important near duplicates from a large set of photos taken by a typical system user or consumer of today with a smartphone with a high level of accuracy unseen in prior art.

Figure 3:
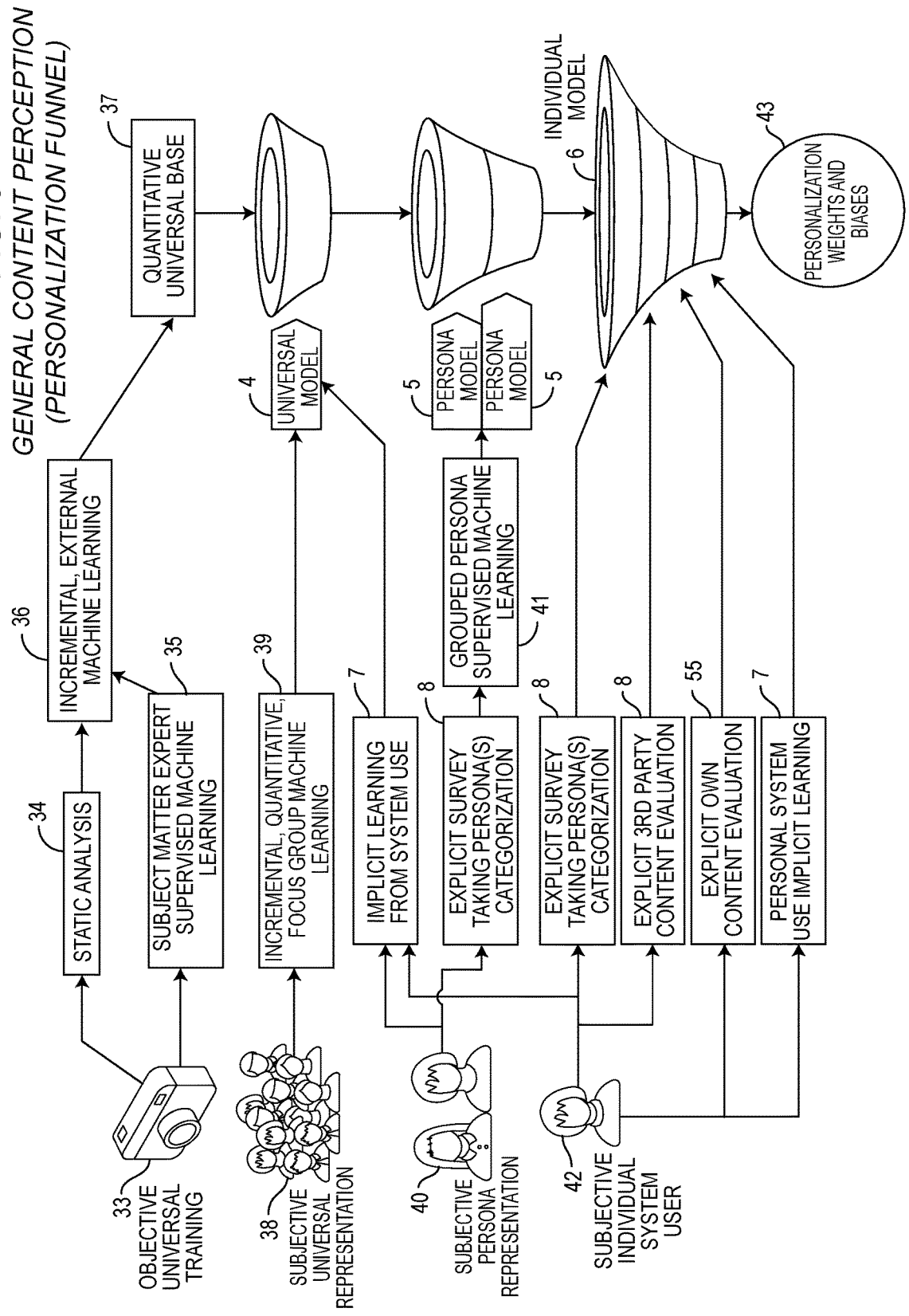
FIG. 3 is a work flow diagram that focuses on the general content perception/personalization funnel.

FIG. 3 is a work flow diagram that focuses on the general content perception, or GCP/personalization funnel. This part of the system learns from implicit and explicit analysis of the user's content and behavior, then models how a system user generally perceives content, e.g. what the user finds meaningful across objective and subjective image dimensions. It's important to note that the GCP is the self-improving record of how the system user perceives content/images in general; the personalization funnel is the mechanism by which the system applies that understanding when analyzing new content/images to predict how meaningful the image would be to the system user.

An objective base helps to filter and frame subjective learning. For example, detecting photos accidentally taken with full or no exposure (all black or all white) is universally able to be rejected without wasting further resources.

(35) Subject matter experts, such as professional and acclaimed photographers, provide further universal photographic feature learning, such as composition and color basics.

(36) Universal models are trained out-of-band to system operation (external), with small nudges that are not too disruptive to the foundational models, avoiding a large cascade effect.

(37) Quantitative universal base provides no subjective traits and is therefore only half of the total universal model's composition.

(38) In conducting ethnographic research on subjective features for content, some universal standards emerge across every demographic and persona group.

(39) Universal qualitative training is captured, also with small and incremental nudges to overall learning as part of an external and ongoing system improvement process.

(40) Participants for persona learning are selected through surveys.

(41) Persona categorized research subjects provide supervised system learning in an external, ongoing, and incremental basis.

(42) Individual system users provide ongoing, incremental explicit and implicit learning through use of implicit content and explicit training functions.

(43) The resulting biases and weights produced from the funnel of personalization can be used and reused throughout the overall content evaluation processes.

The GCP system's first layer is learnings about universally aesthetic values, e.g. preferred aspect ratios, and, technical properties, e.g. contrast levels, common in a wide variety of photography that can be assumed to be shared by most everyone as they dominate art, film and photography across the record of these media. This universal learning is supervised and aimed at teaching the system about the qualities people generally agree are present in examples of exceptional and pleasing photographs. This layer forms the basis of all the individual AI instances, i.e. the system as it is established for an individual user.

The initial invention relied on universal aesthetics composition systems and models from the consumer off the shelf (COTS) software market that are used to predict objective composition qualities of images in an aggregate fashion. These systems and models were transformed in the original invention into a system capable of subjective analysis of objectively measurable qualities by the effect of the personalization funnel (03). Now the invention has been modified with a composition system which analyzes content along various specific aesthetic composition dimensions through the lens of the invention user's subjective perspective as well as generative "idealized" composition measures as trained through the collection of subject matter expert feedback on core composition qualities to predict granular independent qualities of the content and combines them back together to create a novel aggregate composition prediction.

As with other systems of the invention, the composition dimensions/qualities predicted by the invention are used because they, with the specific overlay of subjective perspective, best predict the compositional value of a photo to an invention user.

The invention's composition modification has multiple advantages over prior art. First, prior art focuses on aggregate composition qualities that doesn't allow for individual outstanding qualities to be considered, the current invention improves on prior art by recognizing the layered and multifaceted nature of visual composition. Second, prior art doesn't allow for individual outstanding qualities that are more predictive of content value to an individual invention user to be amplified by subjective bias of the invention user, the current invention does allow individual outstanding qualities that are more predictive of content value to an individual invention user to be amplified by subjective bias of the invention user making the content selection process of the current invention inherently more accurate that prior art. Third, prior art composition systems are analysis only systems and have no generative features to improve the image analysis and selection systems outcomes, the current invention analyzes new media to predict its compositional qualities and then generates a new novel piece of content geometry and then compares the predicted compositional qualities of an image the system generated ideal version of the same content geometry to add precision to the inventions compositional quality predictions. Lastly, prior are being aggregate based systems, do not permit individual dimensions and their strength to influence the perception of other independent content qualities because prior are makes one prediction about content composition where the current invention uses every dimension and the predictions of the system to influence downstream and sometimes previous dimensions in a recursive process to improve the precision of dimension predictions on a continuous basis. The modified composition system is active in the creation and continuous improvement of the GCP universal models, the persona models and the Page individual models and, of course, in evaluation of new media/photos in the preferred embodiment.

The next layer of the GCP is the persona model which is a set of baseline perspective models that represent default behaviors and bias patterns common to people who share a core motivation. For instance, a preferred embodiment has a Social Snapper motivational persona model that system users can be associated to via a survey or image analysis process. Persona models are trained by interacting with users that are pre-identified as being motivated by status and social competition. When the system user is determined to align to the Social Snapper persona, the system overlays the Social Snapper behavior, preference and perspective biases on top of the universal models so that the system will now understand, for example, that images containing the user themselves, which have high clarity and close cropping are more meaningful to the user than images that do not have these qualities/these qualities in combination. In a preferred embodiment as described in FIG. 3, the system has multiple baseline motivational persona models. A system user is assigned a percentage mix of two or more of the persona models. This mix of personas better mimics the human condition where people and their behavior/decisions are driven by a mix of motivations where the relative influence of any one motivation on user behavior/decisions changes based on context as well as other situational factors.

The final layer in the GCP is the individual model layer where the system learns and records the user perspective across a variety of subjective image perception dimensions including motivation, mood, subject matter, composition, color, lighting, cadence, photography best practices, aesthetics, etc.

The output of the GCP is a set of Personalization Weight and Bias values the system predicts that allow the invention to apply all the learnings representing the user perspective to image personalization and curation tasks.

Objective Universal Training 33 provides a static analysis 34 and a subject matter expert supervised machine learning function 35. These allow for incremental, external machine learning 36 which creates a quantitative universal base 37, which is fed into the personalization funnel. The first layer of this funnel is the subjective universal representation 38, which allows for incremental, qualitative machine learning 39 which feeds into the universal model 4. The next "layer" of the funnel is a subjective persona representation 40, which contains implicit learning from system use 7, which in turns helps to create the universal model 4. The subjective persona representation 40 also includes explicit survey taking persona(s) categorization 8 which allows for grouped personal supervised machine learning 41, which in turn helps to create both a personal model 5 that feeds into the first layer of the personalization funnel and the personal model 5 that feeds into the second layer.

FIG. 3 also illustrates the subjective individual system user 42 component, which in addition to feeding into the implicit learning from system use 7 component, also contains several additional components. An explicit survey taking persona(s) categorization 8, an explicit 3$^{rd}$ party content evaluation 8 and a personal system use implicit learning 7 component each feed into successively "lower" layers of the personalization funnel. The result of all these components is a personalization weights and biases 43 component, which is used to predict which images from a set of images a user will find meaningful.

Figure 4:
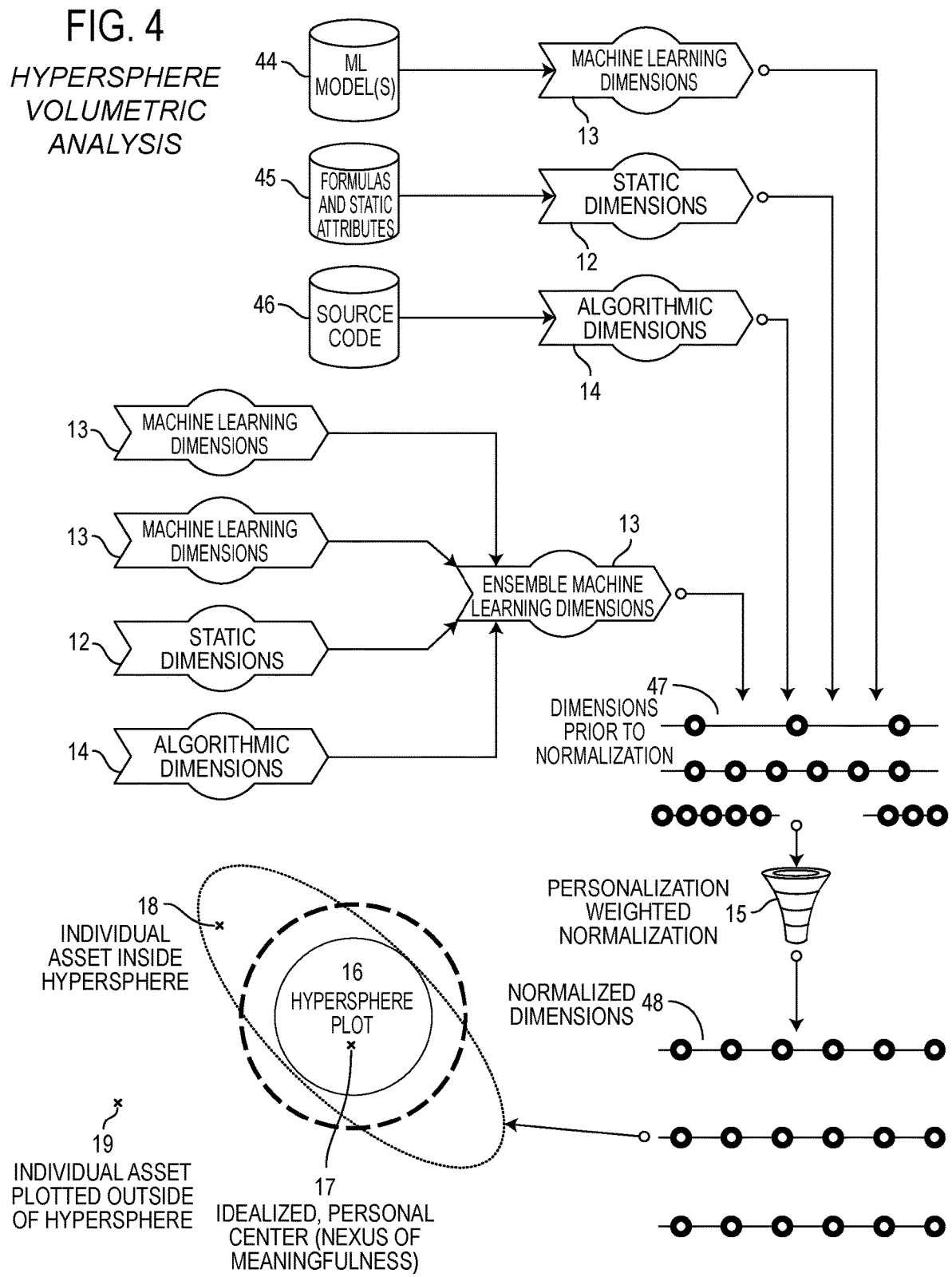
FIG. 4 is yet another work flow diagram showing the hypersphere volumetric analysis portion of the invention.

FIG. 4 is yet another work flow diagram showing the hypersphere volumetric analysis portion of the invention. This figure illustrates how the various components that result in normalized dimensions 48 are combined, and the role of the hypersphere plot 16. From the ML Model(s) 44, a machine learning dimension 13 helps to create dimensions prior to normalization 47. Also contributing to the dimensions prior to normalization 47 is a static dimension 12 created from formulas and static attributes 45 and an algorithmic dimension 14 created from source code 46.

Also contributing to the process is an ensemble machine learning dimension 13 which is created from a combination of a machine learning dimension 13, a static dimension 12 and an algorithmic dimension 14. The various dimensions then go "into the personalization funnel" where a personalized weighted normalization 15 function occurs, resulting in a normalized dimension 48.

The one or more normalized dimensions 48 go through the hypersphere plot 16 process, which includes an idealized personal center (Nexus of Meaningfulness) 17, and results in an individual asset 18, whereupon the individual asset can be plotted outside of the hypersphere in a "individual asset plotted outside of the hypersphere" 19.

Machine Learning (ML) models are any models which can adapt and learn through either normal system use or explicit training cycles. Common examples include computer neural networks, LSTMs, CNNs, etc. These individual tools work together or independently to satisfy answering one, and only one specific question as a range of probability, packaged as one dimension of the hypersphere (a sphere with N-dimensions greater than 3 defined with a center point of the ideal, personal center or nexus of meaningfulness and a radius representing the limit for content qualification).

(45) Formulas and Static Attributes represent source code and metadata which does not change and needs not learn or adapt. For example, the timestamp of a photo or the top two predominant color averages within a given range. These are converted into dimensions that can be weighted and normalized according to personal preferences.

(46) Source Code powers algorithmic dimensions that improve over time, but only through explicit code updates through external processes to the running system. For example, calculating the horizon and rotation of an image may include algorithmic edge detection followed by a series of analyses which can continuously be improved upon.

(47) Dimensions Prior to Normalization shows how complex normalization can be with a wide variety of types of dimensional plots. Normalization stitches together graph gaps, reverses and flattens exponential or linear stretching, and much more so that the sphere can be fully symmetrical and so that personalization and learning can drive direct change to the axis used in plotting and analysis.

(48) Normalized dimensions appear fully uniform and are ready for plotting content.

Figure 5:
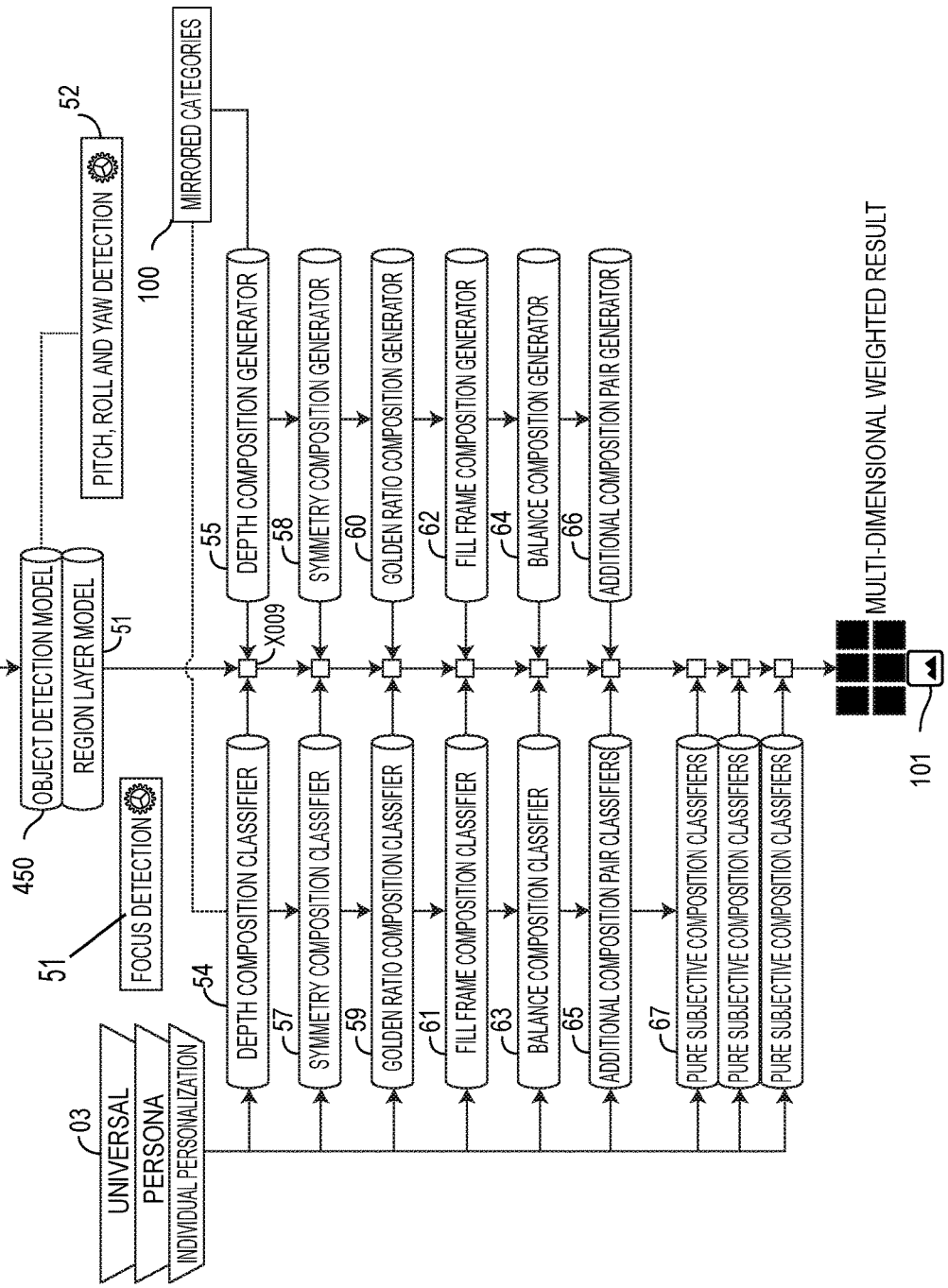
FIG. 5 is yet another work flow diagram showing the Subjective Composition Analysis System

FIG. 5 is yet another work flow diagram showing the Subjective Composition Analysis System. FIG. 5 shows how, in the preferred embodiment of the system, the system predicts the compositional qualities and strength of those qualities of content across a variety of meaningful aesthetic dimensions through the lens of the invention user's subjective visual perspective. The visual composition of media is an integral factor when evaluating the subjective meaningfulness conveyed by media because of its universal applicability to visual content perception. Composition and the ability to recognize and predict/measure the strength of accepted composition elements, like subject matter balance and framing, is transformed in the system, using the user's subjective perspective, into a predictive factor of increased importance. The current invention, unlike prior art, can recognize not only good or bad composition qualities in media but also if the mix and strength of the composition qualities in the media will be specifically, subjectively meaningful to the individual invention user.

In FIG. 5, it is important to note, the objective composition analysis is aided by a novel process of data transformation where the analysis outputs are determined through a generative process. This system attempts to define the idealized form of a given type of composition in reference to the content being analyzed and then uses statistical rules to determine how far off the actual piece of content is from that idealized form. Subjective composition, by contrast, is predicted via a probability influenced both by the personalization funnel, models that come before it, and any other analysis data points previously saved as metadata to the media, such as the focus of the content or the pitch and angle of the framing.

The Singular Media for Analysis (49) Depicts media ready for analysis. This is content ready to be analyzed.

The Object Detection Model (450) shows how some prior model data feeds forward to help inform the Composition Analysis model, such as the Object Detection Model. Static and algorithmic features such as overall media visual clarity, object detection, camera type, date of media capture, and any number of other factors can feed into a learning system that constantly improves in its subjective and objective classifications of composition.

The Region Layer Model (51) shows, again, how some prior model data feeds forward to help inform the Composition Analysis model, such as the Region Layer Model which identifies large continuous regions assisting many boundary attributes within content such as foreground vs background or surface detection. Focus Detection (53) is also used in the compilation of data.

The Clarity, Pitch, Roll & Yaw Detection element (52) shows how some prior static, algorithmic, or learning models are used to feed forward data, helping inform Composition Analysis. For example, Pitch, Roll, and Yaw detection provides detected orientation data on the camera used to capture content.

The Focus Detection element (53) shows how some prior static, algorithmic, or learning models are used to feed forward data, helping inform Composition Analysis. For example, Focus Detection provides a "blur" index on different important regions of the content.

This is where the Personalization Funnel once again plays an important part in defining the subjective elements of forward models. The Personalization Funnel touches nearly every process and composition is no exception. The flow from composition model to composition model is weighted and interpreted by personal preferences for subjective features.

In the Depth Composition Classifier (54), the Symmetry Composition Classifier (57), the Golden Ration Composition Classifier (59), the Fill Frame Composition Classifier (61), the Balance Composition Classifier (63) the Additional Composition Pair Classifier (65) and the Pure Subjective Composition Classifiers (67), a set of separate subjective and highly personalized set of models come into play.

The first is the Depth Composition Classifier (54), this model of a core composition concept helps to inform what a system user would personally find meaningful and aesthetically aligned to their personal visual perspective. It is important to note the difference because even basic compositional elements, like use of pattern or texture can be emotionally meaningful without being aesthetically pleasing nor intended as aesthetic elements in visual content. For example, objectively Depth Composition can be defined but whether that Depth Composition subjectively helps or hurts the content in question is subjective and personal in nature.

In the Depth Composition Generator (55), the Symmetry Composition Generator (58), the Golden Ratio Composition Generator (59), the Fill Frame Composition Generator (61), the Balance Composition Generator (63) and the Additional Composition Pair Generators (65) a set of separate objective models of a core composition concept has been created through extensive system learning from subject matter experts, such as professional photographers, who have well defined "universal" definitions of what represents or doesn't represent a common composition concept.

We see this first in the Depth Composition Generator (55), which helps to evaluate Depth via the generation of an ideal composition based on the induvial piece of content based on analysis of foreground and background elements.

The Models Merge to Singular Dimension (56) depicts how the objective composition elements are combined and interpreted by their mirror subjective composition elements to create a comprehensive analysis of that form of composition, fed forward through the model pipeline to help, where applicable, in informing forward models.

The Symmetry Composition Classifier (57) shows a core composition concept helping to inform what a system user would personally find meaningful. For example, objectively Symmetry Composition Generator (58) can be defined but whether that Symmetry Composition subjectively helps or hurts the content in question is subjective and personal in nature.

Symmetry Composition Generator (58) shows an objective model of a core composition concept, Symmetry Composition can be evaluated for a given piece of content based on analysis of the primary subjects or objects of the content and how they are framed. Results of previous composition types can influence new composition models.

Golden Ratio Composition Classifier (59) is the layer in composition analysis where an objective model of a core composition concept, the Golden Ratio Composition Generator (60) resides and can determine the alignment of the content to the idealized Golden Ratio geometry for the specific piece of content's aspect ratio. This alignment can be defined but whether that Golden Ratio Composition subjectively helps or hurts the content in question is subjective and personal in nature.

Golden Ratio Composition Generator (60) depicts an objective model of a core composition concept, the Golden Ratio Composition, can be evaluated for a given piece of content based on analysis of object internal alignment Golden Ration geometry and framing within the content.

The Fill Frame Composition Classifier (61) shows a core composition concept helping to inform what a system user would personally find meaningful. Fill the Frame Composition Classifier can objectively determine Fill Frame Composition Generator (62) but whether that Fill Frame Composition subjectively helps or hurts the content in question is subjective and personal in nature.

Fill Frame Composition Generator (62) shows an objective model of a core composition concept, Fill Frame Composition can be evaluated for a given piece of content based on analysis of the primary subject detected and its framing within the content.

The Balance Composition Classifier (63) shows a core composition concept helping to inform what a system user would personally find meaningful. Objectively, Balance Composition Generator (64) can be defined but whether that Balance Composition subjectively helps or hurts the content in question is subjective and personal in nature.

Balance Composition Generator (64) shows an objective model of a core composition concept, Balance Composition can be evaluated for a given piece of content based on analysis of object layout within the framing of content.

The Additional Composition Pair Classifiers (65) shows a core composition concept helping to inform what a system user would personally find meaningful. Additional Composition Pair Classifiers (65) in FIG. 5 specifically calls out that this pattern can repeat for any number of composition concepts where subjective models can achieve a level of meaningful predictive fidelity.

The Additional Composition Pair Generators (66) show an objective model of a core composition concept, Additional Composition Pair Generators (66) in FIG. 5 specifically calls out that this pattern can repeat for any number of composition concepts if they can be objectively classified.

The Pure Subjective Composition Classifiers (67) depict how additional Subjective Composition Classifier models are used which have no currently known objective classification to mirror, but which still provide useful subjective meaningfulness analysis of a given piece of content.

The Multi-Dimensional Weighted Result (101) depicts how all the composition model analysis are compiled into dimensions representing the subjective meaningfulness of the overall composition concepts to be plotted and normalized separately, as FIG. 5 represents just one ensemble model within the larger content evaluation system. It's important to note, Compositional dimension value is can be in the form of either a probability or can be created through composition generators predicting ideal versions of composition based upon clip coordinates that are then compared with the existing media's form, providing a scalar representing delta.

Mirror Categories (100) Illustrate how many objective composition categories have mirrored subjective composition types.

Figure 6:
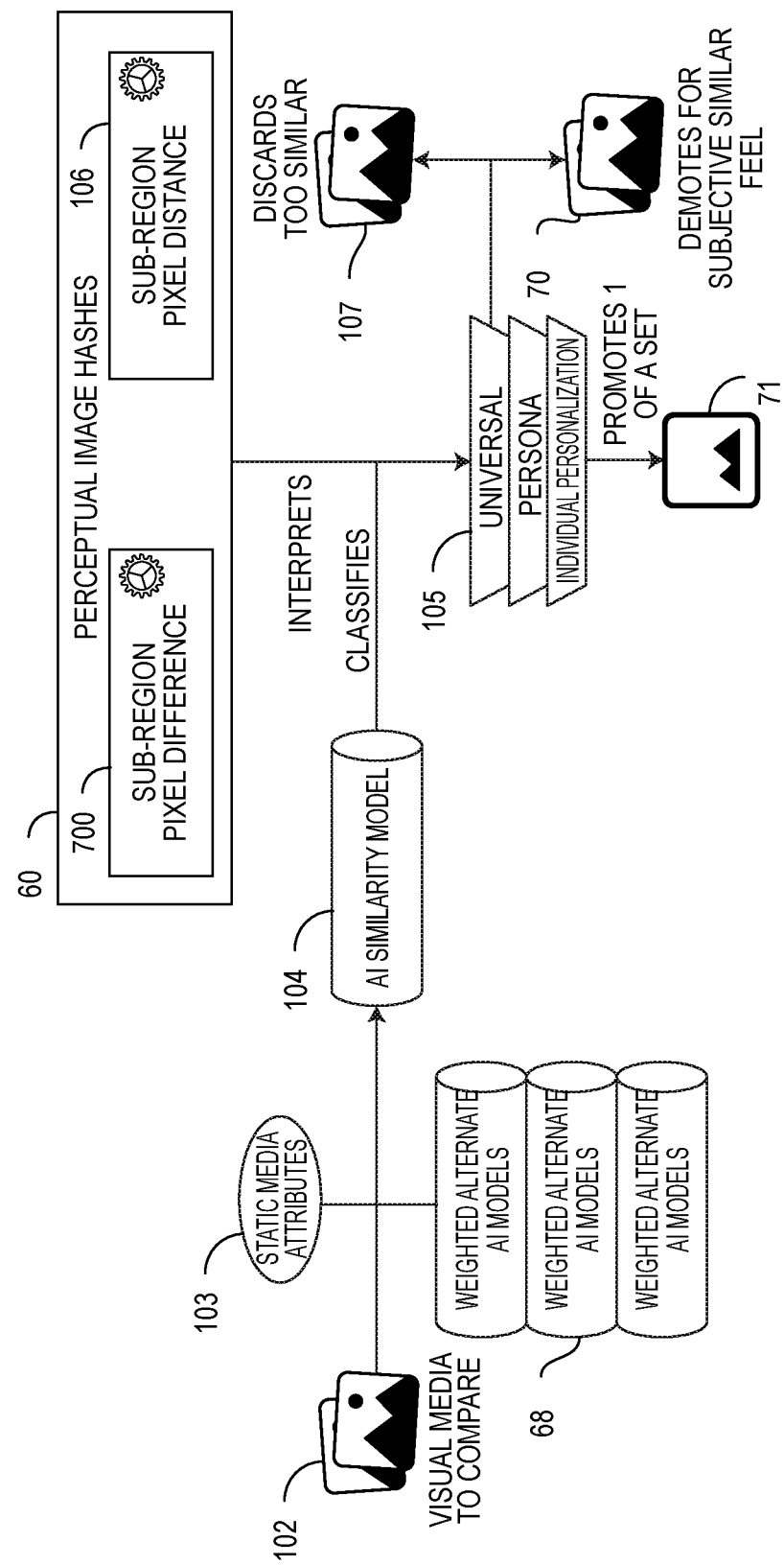
FIG. 6 is a work flow diagram showing the Similarities Detection System Flow system.

FIG. 6 is a work flow diagram showing the Similarities Detection System Flow system. FIG. 6 shows the preferred embodiment of the system that predicts which of the similar photos would be the most meaningful to the user when compared to the other images/content in a set of similar content. Duplicate and lesser quality near-duplicate content identification is critical to the accurate and precise selection of meaningful content. Systems that do not identify and remove or demote duplicates and lesser quality near-duplicates will inherently produce inferior content selection results. That is, the purpose of a selection system is to identify a subset of content from a larger set. This inherent principle of selection means that the output of a selection system is a finite set culled from a larger set. The presence of duplicates and lesser quality near-duplicates in the finite selection set pushes out content that otherwise would have been in the result set where the duplicate or lesser quality near-duplicate appear. Prior art makes some attempt to remove duplicates through meta data comparison, which is in turn is inherently flawed compared to the current invention's visual duplicate identification method, but, prior art does not consider the more serious problem of near duplicates at all. The dilution that results from this omission in prior art impairs prior art's ability to make highly accurate selections and instead shows the user the same or nearly same but less attractive content repeatedly in content sets where it is common to have duplicate and near duplicate content exist side by side. Note, the invention's ability to select the best of near-duplicate content produces benefits for commercial uses, e.g. finding the best marketing image from a photo shoot collection, that prior art also fails to consider or solve.

FIG. 6 shows how the system identifies duplicate and near-duplicate images and uniquely selects the best of a series of near duplicate content/images using the subjective perspective of the system user as a guide to selecting the best of the similar images. The invention marks a significant improvement over prior art by improving the ability of the invention to automatically select meaningful content for system users without repeating or nearly similar content diluting the results.

Visual Media to Compare (102) depicts Media for Analysis. This is content ready to be analyzed.

Static Media Attributes (103) is where static attributes attached to the Visual Media to Compare (102) are extracted. These include when the media was recorded, geolocation, it's resolution, the media capture device or in the case of photos, the "exif" meta-data including manufacturer specific attributes. These limited and inconsistent media attributes are often the main attributes used in prior art whereas the current invention recognizes that these attributes are important as a base but not sufficient for the overall selection task.

Weighted Alternate AI Models (68) shows the Similarity detection method depicted in FIG. 6 is one part of many AI (or algorithmic) models which feed forward their data for analysis in this similarity model. For example, object detection, color analysis, and any number of other relevant processed data may feed forward into this model for its use in detecting duplicate or similar content. By feeding in the results of previous models in the system flow, the invention improves the prediction accuracy of the similarity system and models. For example, perhaps the setting and poses are the same, however a photo or video includes different people at the same event. These may deserve independent evaluation, influenced further down the line by individualized preferences and other factors.

Figure 8:
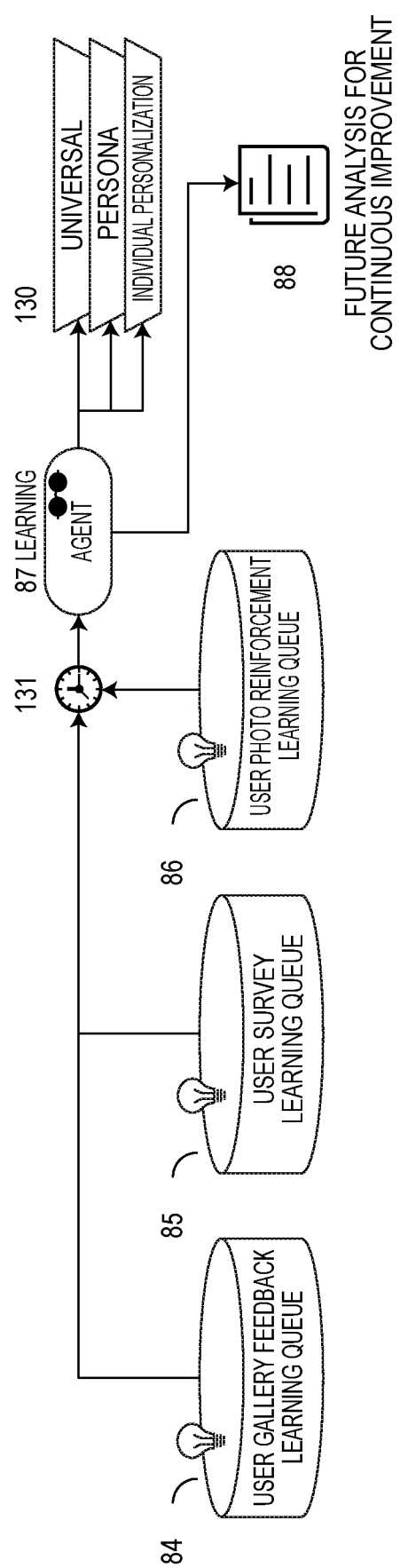
FIG. 8 is a work flow diagram showing the Personalized Continuous Learning System component of the invention.

AI Similarity Model (104) show the system's core Similarity Model, this subsystem is AI in nature due to its ability to self-learn and adapt as described in FIG. 8, is used to evaluate content for duplication or similarity traits.

Perceptual Image Hashes (69) shows a common technique for copyright detection known as "Perceptual Image Hashes" is repurposed to help interpret the results of the AI Similarity Model (104). The system transforms this method known in the art by using the Algorithmic "standard" distance and difference hashes to help interpret learning models rather than feeding them. This allows other models, static media attributes, and the media data itself to be the primary factors in classification while still utilizing image hash algorithms to add insights to the results. This step was a key advancement that led to improved similarity detection.

Universal Persona (105) shows a Sub-Region Pixel Difference hash that is used to compute if one photo is a subset of another, typically used for copyright detection, but used here as a part of AI Similarity Model (104) interpretation.

Sub-Region Pixel Distance (106) shows a further extension of methods well known in the art, here a Sub-Region Pixel Distance hash that is used to compute if one photo is a modified version of another, typically used for copyright detection, but used here as a part of AI Similarity Model (104) interpretation.

In the Personalization Funnel containing the General Content Perspective is used to influence and further interpret similarity detection. Personalization is used to help determine if borderline similar content should be discarded (107) or demoted (negatively weighted) as in Demotes for Subjective Similar Feel (70). The Personalization Funnel touches nearly every process and similarity is no exception. Beyond the typical subjective categories, similarity judgements can be influenced by personal preferences, normalizing various dimensions of similarity differently and effecting natural language generation.

Discards Too Similar (107) shows the system step of Discard Too Similar, which is a key branch in the system processes when content that is predicted to be too similar to better content is discarded from the overall set so as to not pollute the results returned to end users with redundant media.

Demotes for Subjective Similar Feel (70) depicts where the system Demotes for Similar Subjective Feel, content that is not considered a duplicate of better content, but which shares so many similarities that other content that system users would prefer to see more diverse types of content ahead of it, are negatively weighted within its dimensions to artificially "demote" it, based upon the individual personalization preferences of system users Universal Persona (105).

Promoted One Of A Set (71) depicts where the system promotes a single item of a Set of the content that represents the best of a series or "set" of content is promoted through weighting it's coordinates towards the meaningfulness center of the hypersphere. This is because the system user spent additional time and interest in creating a series and therefore valued the best of that series/set uniquely.

Figure 7:
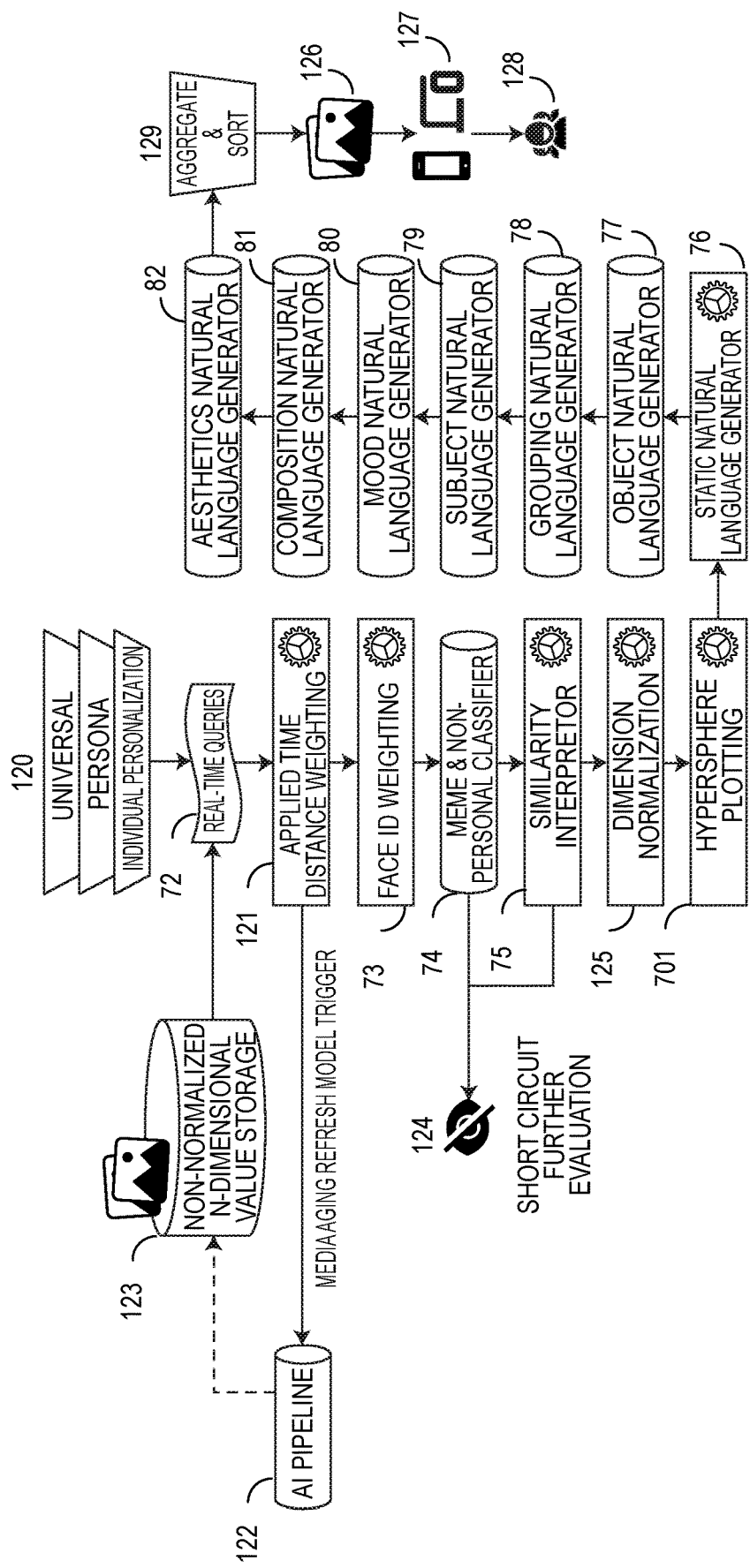
FIG. 7 is a work flow diagram showing the Realtime Evaluation System.

FIG. 7 is a work flow diagram showing the Realtime Evaluation System. In a preferred embodiment of the system, Real-time queries use all current available data about end users, their associated users, and all their current content to select meaningful, filtered sets of media on demand for end users. The method suspends prediction data about media quality dimensions in a non-aggregated and non-normalized state so it can be used to impact the analysis of content that come after the piece of content in question and most beneficially, to aid in the analysis of content/images that came before the piece of content in question, in real time, in the analysis queue. This process is not recursive in nature as much as it is a suspension of data transformation in a non-normalized state. This data is then used in an ambient analysis technique across all entities currently being analyzed and waiting in the queue.

In the preferred embodiment of the system, aggregate and/or real-time photo evaluation takes a collection of visual content and evaluates it together for natural language explanations and comparisons for similarity, common faces, etc.

The Real-time Evaluation system starts with Real-Time Queries (72) where Real-Time Queries act as a trigger to engage a real-time evaluation of a set of content through the system. The key characteristics of the real-time evaluation is to allow for cross content data to influence subjective meaningfulness as well as provide a way to influence subjective meaningfulness as a function of Time (10) by taking into account the timing of the real-time query as well as relevant model updates that have occurred through the Personalized Continuous Composition Learning depicted in FIG. 8. Queries can be triggered from simple user requests, such as an unfiltered view of a user's selected set of content, complex requests involving search criteria or cross-user requirements, or may be triggered automatically by calendar events wherein, for example, a user may be prompted to evaluate a content set selected for use in a present for the birthday of a grandparent, e.g. a photobook created to highlight the games and travel for a child's hockey team, etc.

Then in the next step, (120) the Personalization Funnel (03) is once again used as a primary input into the interpretation and evaluation of forward models in the system, feeding into Real-Time Queries (72)

Applied Time Distance Weighting (121) depicts how the real-time content analysis may consider time-oriented attributes to the content. In the simplest case it may adjust the weights or filters of content based on query criteria and the age of given content. In more complex cases it may model user preferences as a function of data identified over time, such as the frequency of an individual face within a system user's photo library, over time.

Figure 9:
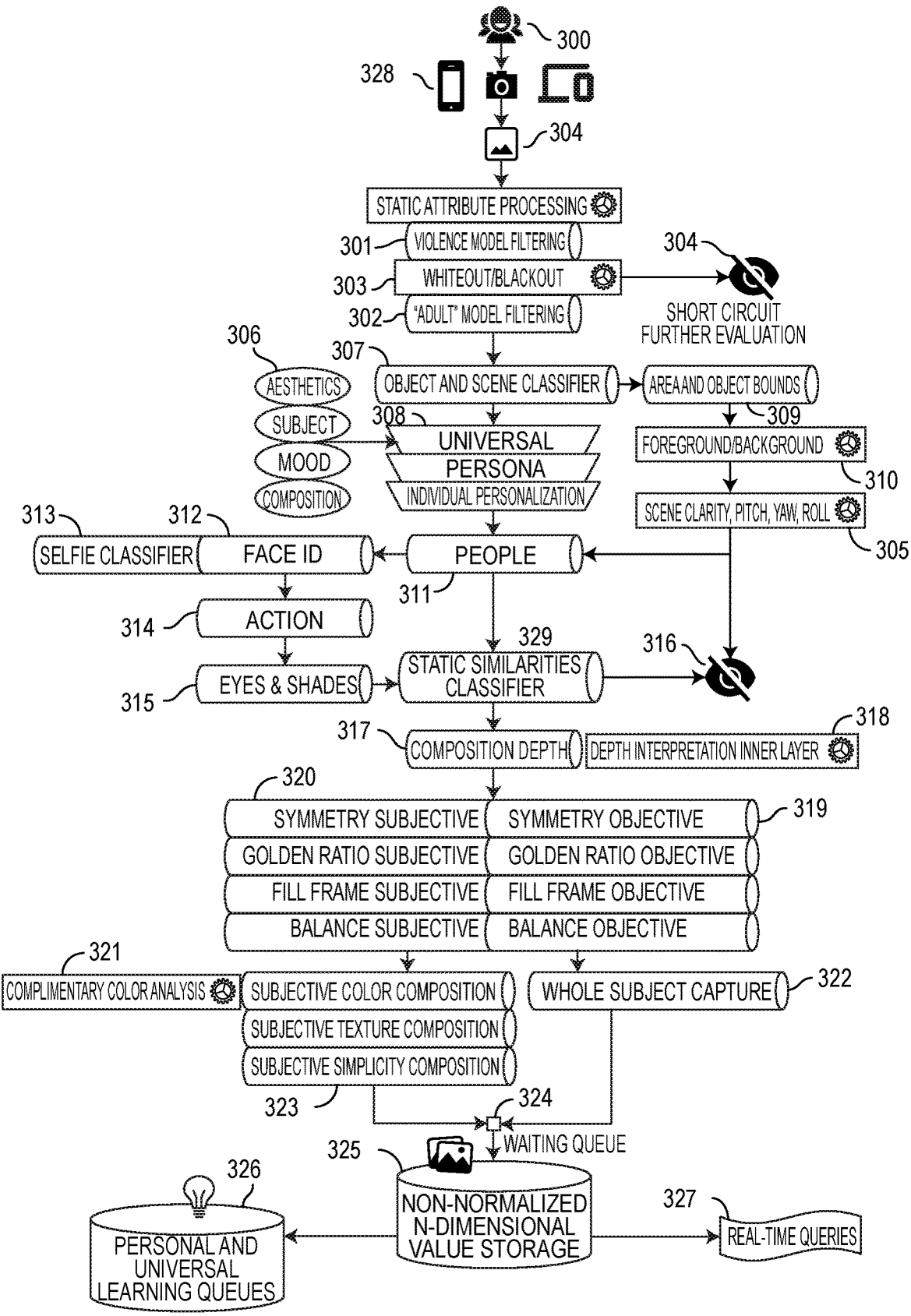
FIG. 9 is a work flow diagram illustrating the New Media Flow.

To further illustrate the invention subsystems working together, the AI Pipeline (122) represents aging pre-processed data that was marked for renewed analysis of static attributes as documented in FIG. 9, represented here as an AI pipeline. At appropriate times, photos that need refreshed analysis are run through the new photo journey.

The Non-Normalized N-Dimensional Value Storage (numbered differently elsewhere, but here referenced as 123) depicts the data store that real-time queries draw upon for the saved data related to individual pieces of content, generated through the process described in FIG. 9.

In the Face ID Weighting step (73), the system face ID weighting of content based on the frequency and timing of subjects found across all relevant content is used to in the real-time evaluation.

The ability to recognize and demote content that is categorically not a good selection is shown in Meme & Non-Personal Classifier (74). Here content that is mixed in with personal photos but represent downloads, "memes", or other non-personal photos, are recognized and, with a high degree of certainty, are discarded from further evaluation in Short Circuit Further Evaluation (124).

To gain further efficiency, in Short Circuit Further Evaluation (124), some content evaluation will result in the ability to skip additional processing, thereby short-circuiting further evaluation. For example, if evaluating a photo that appears to be a downloaded comic or Internet meme (74), that photo is tagged as such and additional processing does not occur.

It is at this point in real-time evaluation that the invention's novel Similarity as seen in (13)(14) of or "de-duplication" detection identifies what content is too similar to each other to all pass on together and which of that content is of the highest quality to promote while discarding the rest thereby Short-Circuiting Further Evaluation (124).

At this point in real-time evaluation, the system generated prediction data begins to transform into analysis outputs regarding the specific meaningfulness of content to an individual user. In Dimensions, e.g. content attribute evaluations that impact the subjective meaningfulness of that content, are normalized with respect to each other and through weights passed down through the personalization funnel (120). Each piece of content has its own scale based on how independent dimensions could influence others, which dimensions apply to given content and which do not. For example, when evaluating an image, dimensions relating to "people" do not disqualify images which do not have people from being plotted for subjective meaningfulness, however the lack of people may scale dimensions in a way to make the "ideal center" or nexus of meaningfulness more challenging to achieve for content with any non-ideal attributes.

In Dimension Normalization (125), plotting content within the normalized Dimension Normalization n-dimensional space along with the idealized center for personalized, subjective meaningfulness is shown. Part of the plotting of these points is returning the distance between the "ideal center" and the point of the content. If that distance if beyond the length of a given filter in the real-time query, it can be thought to be outside the "hypersphere" and may be optionally discarded from further evaluation.

The Static Natural Language Generator (76), the Object Natural Language Generator (77), the Grouping Natural Language Generator (78), the Subject Natural Language Generator (79), the Mood Natural Language Generator (80)

and the Composition Natural Language Generator (81) all depict Personalization in Natural Language to explain the systems predictions, findings, ranking, analysis, etc. in a readable format that is understandable to the end user. The invention improves on prior art natural language generation by extending the influence of the subjective perspective represented by the user's General Content Perspective (03) into the invention's own natural language generation. That is, all language presented to the user through natural language generation is tailored specifically to the individual user's predicted mix of baseline motivational persona AI models. Each user of the invention will experience the system's natural language feedback and analysis in a slightly different way matched to the system's unique representation of the user's perspectives. The Personalization in Natural Language influences various system NLG actions including but not limited to:

Static Natural Language Generator (76) allows for pre-written, static language can be triggered to explain common analysis results to end users.

Object Natural Language Generator (77) uses object detection can add richer descriptions of analysis results to end users.

Grouping Natural Language Generator (78) uses combinations of attributes and attribute conditions to convey a richer description of analysis results to end users. For example, if a scene in the content is of a wedding and the mood is "silly" and the subject is dancing, these three attributes from three different prior models can be combined into a variety of explicit natural language explaining how the combination influenced the overall plot of the content.

Subject Natural Language Generator (79) allows for generation of subjectively meaningful language around analysis of the subject of the content.

Mood Natural Language Generator (80) allows for the generation of subjectively meaningful language around analysis of the mood of the content.

Composition Natural Language Generator (81) allows for the generation of subjectively meaningful language around analysis of the composition of the content.

The Aesthetics Natural Language Generator (82) allows for the generation of subjectively meaningful language around analysis of the aesthetics of the content, often combined with other special attention attributes to create a longer, comprehensive sentence about the strongest subjective indicators in plotting content. Components of natural language can be look-ups based on hand written content, look-ups based on NLG analysis of similar photos, fully automated generation based on personalization, or a fluid mix of any of these techniques.

Then in Aggregate and Sort (129) real-time query results are aggregated and sorted according to the criteria of the query across all the content evaluated in this process.

Content is then transmitted or loaded back to end users in (126) once analysis, aggregation, and sorting are complete.

(127) depicts how visual representations of content, originals or copies of the content, along with statistical and/or language explanations regarding subjective meaningfulness are made available to the system user through visual devices such as phones, tablets, VR/AR headsets, TVs, etc., or in some processes even physical visual mediums such as photobooks, etc., such that a user (128) benefits from the system.

FIG. 8 is a work flow diagram showing the Personalized Continuous Learning System component of the invention-a system that uses the subjective perspective of the individual system user to influence how the system learns, the strength of what the system learns and the predictive outputs of future analysis.

FIG. 8 shows how, in a preferred embodiment of the system, the subjective perspective of the individual system user is used to influence how the system learns, the strength of what the system learns and the predictive outputs of future analysis.

Starting at the User Gallery Feedback Learning Queue (84), the User Survey Learning Queue (85) and the User Photo Reinforcement Learning Queue (86) the system is improved over time through explicit and implicit use of its features, including:

User Gallery Feedback Learning Queue (84) provides the explicit user feedback elicited as an interaction through a gallery display of content in which users can like or dislike results and explain their reasoning. This data is stored for periodic system wide updates of model behavior to continuously improve the system analyses.

The User Survey Learning Queue (85) handles the explicit user preferences ascertained through visual or verbal surveys. Survey data is stored for periodic system wide updates of model behavior to continuously improve the system analyses.

Through User Photo Reinforcement Learning Queue (86), the implicit use of visual content such as ongoing statistical analysis of the volume and attributes of content the user is processing through the system. This data, originating from the Media Flow Through System depicted in FIG. 9, is stored for periodic system wide updates of model behavior to continuously improve the system analyses.

Then the Learning Agent (87) depicts how the queue for processing learning data can be triggered by events that would require the prerequisite training, in the case of processing initial survey data to enhance results for the first real-time query analysis of content as described in FIG. 7. It can also be triggered by other useful states or events, such as a volume of data threshold or a periodic timer.

The invention uses an independent agent Learning Agent (87), or process, that orchestrates the various learning data gathered from the data pools (131) for updating the personalization funnel (130 in this figure). In another implementation, the Learning Agent (87) may update aspects of many other relevant models as well. The agent ensures that the rollout and computation required to update models does not interfere with system processing or performance.

The personalization funnel (130) is then enhanced at each layer through the work of the learning agent 87 using the data pooling element (131). In most cases, the Individual Personalization (130 in this figure) is updated as well as the Persona Personalization models by learning in aggregate from all system users who identify with target personas. The Universal Model also learns over time about the aggregate use and feedback from all system users.

Finally, Future Analysis For Continuous Improvement (88) depicts data identified by the learning agent (87) as not suitable or possessing suspect qualities. In a preferred embodiment of the system, this data and analysis are saved to the side for manual inspection as the Future Analysis for Continuous Improvement (88) report.

FIG. 9 is a work flow diagram illustrating the New Media Flow. As a reminder, FIG. 1 is a diagram of the system and its high-level flow from large scale sub-system to sub-system to illustrate how the parts fit together in the whole. FIG. 9 is an expanded view of the same sub-systems where the focus is shifted from how the sub-systems fit together, and affect each other, to instead highlight the specific journey a photo, piece of media or content takes through the preferred embodiment of the invention and the transformations that happen along the way as pixel data is transformed into a usable understanding of user subjective visual perspectives. FIG. 9 depicts the journey of a single, visual content piece as it moves along a journey of AI analysis that is cached and refreshed as the system learns more about the particular end user.

FIG. 9 depicts how, in a preferred embodiment of the system, content created by a system user flows through various analysis to produce usable data outputs and await final analysis triggers. FIG. 9 shows how the system uses the visual subjective perspective of the user throughout the analysis and how the data produced in the predictive analysis is used for continuous learning and analysis of other content.

The System (300) user starts interacting with the system. The system user is a person who has content, media, photos, et al, they have personally taken stored on a computer device, however, the "content and media users" (1) could be a variety of people, groups or institutions.

The Content Capture (328) Depicts how user content is created through consumer content capture devices. The system can also be used with a variety of content created through a wide variety of methods. Visual content is not limited to cameras and can be captured from mobile devices, VR environments, and other consumer electronics.

The Input Plurality Of Content Media element (304) shows the media being consumed by the system, either implicitly through automatic fetching or use of an application specific camera software, or explicitly through user selection.

The Static Attribute Processing element (329) depicts how the content's static attributes are processed and prepared into related data packets to be input into forward models.

The Non-Normalized N-Dimensional Value Storage (103) Shows the media being consumed by the system, either implicitly through automatic fetching or use of an application specific camera software, or explicitly through user selection.

The Personal and Universal Learning Queues (104) Depicts how the content's static attributes are processed and prepared into related data packets to be input into forward models. These attributes can include, for example, "exif" data such as a photo's date and geolocation tags, as well as intrinsic properties of the media such as its resolution, duration in the case of video, and any explicit input captured about the media directly from the end user.

The Violence Model Filtering (301) and the "Adult" Model Filtering (302) depict how media flagged as inappropriate is filtered out early, such as violent or adult imagery, so as to not waste additional computation as well as potentially flag the content for administrative review in applications where moderation is appropriate.

The Whiteout/Blackout item (303) shows how common photo issues, such as either all white or all black images, are detected and discarded early to prevent wasted computation.

The Short Circuit Further Evaluation element (304 in this figure)-depicts how many different conditions, such as those in Violence Model Filtering (301), the Whiteout/Blackout item (303) the "Adult" Model Filtering (302) the Scene Clarity, Pitch, Yaw, Roll (305) (329), short-circuit additional analysis and are discarded and/or flagged. Efficiency in the form of computational time is saved in the invention and is an additional improvement over prior art by ejecting media that doesn't pass certain large impact criteria for evaluation.

Object and Scene Classifier (306) depicts how some early models used in analyzing media are object and scene classifiers. This identifies important characteristics about scenes through common labels, such as "#wedding", as well as individual object labels, such as "#cake", which is largely used as forward fed data to other models.

The Aesthetics column (307) shows subjective personalization categories, the individual models comprising these categories reside in the personalization funnel of (308 in this figure), broken into common visual components that include emotional and aesthetically meaningful qualities. These subjective categories can be many and varied and are not limited to the ones described herein. For example, for categories like mood there could be subcategory components such as "cheerful" and for a major category like "aesthetics" there could be a subcategory such as "good use of color" (or, for negative reactions, corollaries such as "poor use of color").

The Area and Object Bounds (309) shows how models in the pipeline can split and process independent branches, such as in Area and Object Bounds (309) where area and object bounds are identified to provide forward data into models and relate visual spaces and motion to classified objects and surfaces.

The Foreground/Background component (310) shows how foreground and background detection is used as important data to feed forward to future models, including the percentage of area used for each as well as visual boundaries for foreground and background elements.

Scene Clarity, Pitch, Yaw, Roll (305) contains additional informative algorithms are then used to analyze media for quality indicators, often combined forward in the pipeline to make interpreted determinations, such as the pitch, yaw, or roll detected in the content orientation, as well as clarity measures which can be further divided by including (310) Foreground and Background Information.

The Personalization Funnel (306 in this figure) which holds the user's General Content Perspective is applied into the analysis pipeline for subjective, individualized analysis. This can be looped as needed to include multiple individuals in a single analysis for one piece of content.

Then, people (311) that appear within the content can be evaluated for common qualifiers that influence subjective evaluations, weighted by the personalization funnel (308 in this figure) as well as optionally merged parallel models as depicted in FIG. 9 with Area and Object Bounds (309), Foreground/Background component (310), and Scene Clarity, Pitch, Yaw, Roll (305).

Face ID (312) At this point in the system flow, facial recognition is used to power additional analytical data for the purpose of determining subjective meaningfulness based on the individual connections of an individual.

Selfie Classifier (313) In a preferred embodiment of the system, a "selfie" feature of the app allows for the identification and attribute classification of identifying the end user of the system as the subject of the content.

Action (314) depicts how aspects of motion and action are classified for the purpose of predicting subjective meaningfulness for an end user. Combined with data from prior models this can create intricate narratives around "what's happening" in the content, even from still photos.

Eyes and Shades (315) shows the analysis of how subject matter eyes, their positions and coverings are presented within the content, for example, if they are wearing sunglasses.

Then the system provides static elements of similarities attributes. In other words, it identifies and records hashes and attributes that contribute strongly to real time similarity identification and de-duplication, as further described in FIG. 6.

The Composition Depth (317) depicts how composition depth is modeled based on objective subject matter expert data.

The Depth Interpretation Inner Layer (319) Then, the Composition Depth (317) Composition Depth, is further interpreted as a separate process or internal layer to The Composition Depth (317) by taking a direct application of depth indicators such as blur comparing foreground and background along with subject size in relation to the framing, etc.

Additional composition models (320) used for the evaluation of subjective meaningfulness through the lens of the (308) personalization funnel. Some of these models are "symmetric", meaning they are the subjective half to objective versions of the composition type.

The Depth Interpretive Inner Layer (318) and the Whole Subject Capture (322) work in a complimentary process, additional objective composition quality models, trained through analysis of subject matter expert data contribute to predicting the subjective meaningfulness of a piece of content. Some of these models are "symmetric", meaning they are the objective half to subjective versions of the composition type.

Once again, additional composition models (323) are evaluated for subjective meaningfulness through the lens of the (308) personalization funnel. Some of these models can be "asymmetric", meaning they are composition models with no objective mirror type.

Complimentary Color Analysis (321) depicts how complimentary color is evaluated based on the data fed forward from prior models such as foreground/background and surfaces, as well as taking color averages across uniquely identifiable areas of the content.

The Waiting Queue (324) shows the use of parallel model data recombined into a singular data set for the use of further analysis.

The Non-Normalized N-Dimensional Value Storage (325) depicts how the non-normalized versions of each static dimension can be stored for further analysis through Real-Time Queries (327) or for continuous learning through Personalization and Universal Learning Queues (326). It is important to note here that normalization and hypersphere plotting is held for times when content is evaluated in aggregate in order to capture aggregate dimensions such as frequency of identifiable people.

Personalization and Universal Learning Queues (326) shows the step where once the first pass of static analysis of data for a single piece of content is complete, the Non-Normalized N-Dimensional Value Storage (325) can be leveraged to provide continuous learning and improvements to the system, as further detailed in FIG. 8. Continuous learning data is queued to be processed in regular batches at computationally efficient times.

Finally, Real-Time Queries (327) depicts how, when the first pass of static analysis of data for a particular piece of content is complete, the media is available for final analysis triggered by actions instigated by the end users or through automated push analysis sent to end users based upon time or event criteria. This process is further detailed in FIG. 7. However, a single piece of media content's journey is not truly complete until it is also evaluated in aggregate with other content, in order to complete analyses for things like similarities detailed in FIG. 6.

FIG. 10 is discussed under the section on FIG. 1 above.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

REFERENCE NUMBERS USED 1. 1. Content and Media Users
2. Input plurality of content/media.
3. Personalization Funnel
4. 4/4A. Universal Model
5. 5/5A. Persona Model
6. 6/6A. Individual Model
7. Implicit Learning
8. Explicit Learning
9. Continuous Learning and Improvement
10. Time Element
11. Context Element
12. Static Dimensions
13. Other Machine Learning Dimensions
14. Algorithmic Dimensions
15. Normalize Data
16. Hypersphere Plot
17. Idealized, Personal Center
18. Individual Asset
19. Remove Assets outside of Hypersphere.
20. Magnitude Filter
21. Explanation of dimensions and magnitude relationship natural language generation.
22. Presentation of images and explanation of system decisions to user, content meaningfulness human interactions.
23. Explicit and Personalization Feedback Loop.
24. Algorithmic "Difference"
25. Algorithmic "Distance"
26. Feature Similarities
27. Visual Machine Learning Model (CNN).
28. Positive Short Circuit.
29. Negative Short Circuit.
30. Ensemble Learning.
31. Positive Series.
32. Negative Series.
33. Objective Universal Training.
34. Static Analysis.
35. Subject Matter Expert Supervised Machine Learning.
36. Incremental, External Machine Learning.
37. Quantitative Universal Base.
38. Subjective Universal Representation
39. Incremental, Qualitative, Focus Group Machine Learning.
40. Subjected Persona Representation
41. Grouped Personal Supervised Machine Learning.
42. Subjective Individual System User.
43. Personalization Weights and Biases.
44. ML Model(s)
45. Formulas and Static Attributes
46. Source Code 47. Dimensions prior to normalization.
48. Normalized Dimensions.
49. Media for Analysis
50. Personalization in Natural Language Generation
51. Pitch, Roll and Yaw Detection
52. Focus Detection
53. Depth Composition Classifier
54. Depth Composition Generator
55. Explicit Own Content Evaluation
56. Symmetry Composition Classifier
57. Symmetry Composition Generator
58. Golden Ratio Composition Classifier
59. Golden Ration Composition Generator
60. Fill Frame Composition Classifier
61. Fill Frame Composition Generator
62. Balance Composition Classifier
63. Balance Composition Generator
64. Additional Composition Pair Classifiers
65. Additional Composition Pair Generator
66. Pure Subjective Composition Classifiers
67. Weighted Alternative AI Models
68. (Blank).
69. Demotes for Subjective Similar Feel
70. Promotes 1 of a Set
71. Real Time Queries
72. Face ID Weighting
73. Meme & Non-Personal Classifier
74. Similarity Interpreter
75. Static Natural Language Generator
76. Object Natural Language Generator
77. Grouping Natural Language Generator
78. Subject Natural Language Generator
79. Mood Natural Language Generator
80. Composition Natural Language Generator
81. Aesthetics Natural Language Generator
82. (Blank)
83. User Gallery Feedback Learning Queue
84. User Survey Learning Queue
85. User Photo Reinforcement Learning Queue
86. Learning Agent
87. Future Analysis For Continuous Improvement
100. Mirrored Categories
101. Multi-Dimensional Weighted Result
102. Visual Media to Compare
103. Static Media Attributes
104. AI Similarity Model
105. Universal/Persona/Individual Personalization Funnel
106. Sub-Region Pixel Distance
107. Discards Too Similar
120. Universal/Persona/Individual Personalization Funnel
121. Applied Time Distance Waiting.
122. AI Pipeline
123. Non-Normalized N-Dimensional Value Storage
124. Short Circuit Further Evaluation
125. Dimension Normalization
126. Loaded back to End Users
127. Visual Representations of Content
128. User
129. Aggregate & Sort
130. Universal/Persona/Individual Personalization Funnel
131. Data Pools: Collection and Forwarding to Learning Agent.
300. User interface
301. Violence Model Filtering
302. "Adult" Model Filtering
303. Whiteout/Blackout
304. Short Circuit Further Evaluation.
305. Scene, Clarity, Pitch, Yaw, Roll element
306. Aesthetics/Subject/Mood/Composition element.
307. Object and Scene Classifier
308. Universal/Persona/Individual Personalization Funnel
309. Area And Object Bounds
310. Foreground/Background
311. People element
312. Face ID
313. Selfie Classifier
314. Action element
315. Eyes & Shades
316. Short Circuit/Further Evaluation element
317. Composition Depth
318. Depth Interpretation Inner Layer
319. Symmetry/Golden Ratio/Fill Frame/Balance Objective elements
320. Symmetry/Golden Ratio/Fill Frame/Balance Subjective elements
321. Complimentary Color Analysis
322. Whole Subject Capture element
323. Subjective Color/Texture/Simplicity Composition
324. Waiting Queue
325. Non-Normalized N-Dimensional Value Storage
326. Personal And Universal Learning Queues
327. Real-Time Queries.
328. Blank
450. Object Detection Model
　451. Subjection Composition elements
　452. Objective Composition element
700. Sub-Region Pixel Difference.
701. Hypersphere Plotting
800. General Content Perspective, overall combination.
801. Individual Content Perspective, overall combination.
802. Personalization Content Presentation & User Feedback, overall combination
803. Hypersphere Analysis, overall element.

That which is claimed:

1. A computer-implemented method for photo selection, executed by a hardware processor of a computer, said computer-implemented method comprising the steps of:

having a user upload a group of photos from a computer device into a non-transitory computer-readable storage medium of the computer;

having the computer store the group of photos in the non-transitory computer-readable storage medium;

having the computer administer an explicit learning user survey to the user via a graphical user interface displayed on the computer device to obtain survey results;

having the hardware processor of the computer perform an initial pixel analysis of the group of photos that have been uploaded and stored in the non-transitory computer-readable storage medium;

having the hardware processor allocate an assigned persona to the user based on the initial pixel analysis of the group of photos that have been uploaded and the survey results;

having the hardware processor use the assigned persona to serve as a baseline behavioral and preference model and having the hardware processor use the baseline behavioral and preference model to adjust predictions for content selection;

having the hardware processor utilize a machine learning algorithm run by the hardware processor to create and train an initial individual model for the user, wherein the initial individual model comprises a user-specific predictive model tailored to understand subjective tendencies influenced by broad motivational biases, said initial individual model being developed through pixel-level analysis of the group of photos that have been uploaded, targeting identification of both human-readable and machine-readable behaviors, biases, and preferences encapsulated in images during a photo capture process;

using said initial individual model in combination with a photo evaluation persona and a universal photo understanding model to select a set of photos from the group of photos that were uploaded, thereby providing a photo selection;

employing the graphical user interface on the computer device to present the photo selection to the user;

having the hardware processor generate natural language feedback via a natural language processing algorithm, said natural language feedback explaining a rationale behind the photo selection to the user;

employing the graphical user interface on the computer device to display the photo selection and the natural language feedback;

having the computer receive user feedback via the graphical user interface;

having the hardware processor modify the initial individual model to create a modified individual model based on the received user feedback and further implicit learning from photo analysis, using the machine learning algorithm;

having the hardware processor re-select the set of photos for one of two purposes: (1) refining the photo selection based on the modified individual model, or (2) selecting an alternative set from a new group of uploaded photos, both influenced by the modified individual model, wherein the modified individual model has an impact on both data generated by the machine learning algorithm and final selection criteria employed by the machine learning algorithm;

displaying the re-selected set of photos to the user via the computer device;

having the hardware processor monitor new content uploaded into the non-transitory computer-readable storage medium; and having the hardware processor reassess and adjust the modified individual model and the assigned persona based on the new content and further implicit learning from the photo analysis, using the machine learning algorithm.

2. The computer-implemented method as recited in claim 1, further comprising having the hardware processor generate and utilize a multiple dimension hypersphere to select photos.

3. The computer-implemented method as recited in claim 1, further comprising having the hardware processor determine and plot an idealized personal center for the user, create a hypersphere boundary at a distance from the idealized personal center, and utilize the hypersphere boundary to select photos.

4. The computer-implemented method as recited in claim 3, further comprising having the hardware processor modify the hypersphere boundary depending on a change in content of the group of photos.

5. The computer-implemented method as recited in claim 3, further comprising having the hardware processor re-calculate the idealized personal center based on a change in content of the group of photos.

6. The computer-implemented method as recited in claim 3, further comprising having the hardware processor detect qualities and behavior patterns embedded in the images.

7. The computer-implemented method as recited in claim 3, further comprising having the hardware processor detect qualities and behavior patterns embedded in the images and then modify the hypersphere boundary based on the behavior patterns.

8. The computer-implemented method as recited in claim 3, further comprising having the hardware processor detect qualities and behavior patterns embedded in the images and then re-calculate both the idealized personal center and the hypersphere boundary based on the behavior patterns.

9. The computer-implemented method as recited in claim 3, further comprising having the hardware processor detect qualities and patterns embedded in the images by conscious and unconscious behaviors of an image author and detect behavior of the user and then modify the hypersphere boundary based on the behavior.

10. The computer-implemented method recited in claim 1, wherein the step of having the computer administer the explicit learning user survey via the graphical user interface displayed on the computer device to obtain the survey results comprises administering a question and image survey, further comprising surveying the user with a series of behavioral questions to explicitly learn about behavior and motivations of the user, their behavior and motivations.

11. The computer-implemented method recited in claim 1, further comprising uploading additional images one by one through a camera function after an initial library is imported.

12. The computer-implemented method recited in claim 1, wherein the step of having the computer administrate the explicit learning user survey via the graphical user interface displayed on the computer device to obtain the survey results comprises administering a question and image survey.

13. The computer-implemented method recited in claim 1, further comprising surveying the user with a series of behavioral questions to explicitly learn about behavior and motivations of the user.

14. The computer-implemented method recited in claim 1, wherein each persona has a baseline behavior, preference and aesthetic tendency which affects system probability modelling and decision making.

15. The computer-implemented method recited in claim 1, wherein the step of having the computer receive the user feedback via the graphical user interface comprises receiving the user feedback through at least one of direct user input via a keyboard and mouse and through touchscreen interactions.

16. The computer-implemented method recited in claim 1, wherein the step of having the hardware processor modify the initial individual model based on the received user feedback and the further implicit learning from the photo analysis comprises having the hardware processor re-calculate an idealized personal center.

17. The computer-implemented method as recited in claim 1, further comprising having the hardware processor generate and utilize a multiple dimension hypersphere to select photos, determine and plot an idealized personal center for the user, create a hypersphere boundary at a distance from the idealized personal center, and utilize the hypersphere boundary to select the photos.

18. The computer-implemented method as recited in claim 3, further comprising having the hardware processor modify the hypersphere boundary depending on a change in content of the group of photos and re-calculate the idealized personal center based on the change in content of the group of photos.

19. A computer-implemented method for photo selection, executed by a hardware processor of a computer, said computer-implemented method comprising the steps of:
having a user upload a plurality of content from a computer device into a non-transitory computer-readable storage medium of the computer;
having the computer store the plurality of content in the non-transitory computer-readable storage medium;
having the computer administer an explicit learning user survey to the user via a graphical user interface displayed on the computer device to obtain survey results;
having the hardware processor of the computer perform an initial pixel analysis of the plurality of content that have been uploaded and stored in the non-transitory computer-readable storage medium;
having the hardware processor allocate an assigned persona to the user based on the initial pixel analysis of the plurality of content that have been uploaded and the survey results;
having the hardware processor use the assigned persona to serve as a baseline behavioral and preference model and having the hardware processor use the baseline behavioral and preference model to adjust predictions for content selection;
having the hardware processor utilize a machine learning algorithm run by the hardware processor to create and train an initial individual model for the user, wherein the initial individual model comprises a user-specific predictive model tailored to understand subjective tendencies influenced by broad motivational biases, said initial individual model being developed through transforming pixel-level analysis of images that have been input targeting identification of patterns and objective and subjective learnings across the plurality of content that infer behaviors, biases, and preferences;
using said initial individual model in combination with a photo evaluation persona and a universal photo understanding model to select a set of photos from the plurality of content that were uploaded, thereby providing a photo selection;
employing the graphical user interface on the computer device to present the photo selection to the user;
having the hardware processor generate natural language feedback via a natural language processing algorithm, said natural language feedback explaining a rationale behind the photo selection to the user;
employing the graphical user interface on the computer device to display the photo selection and the natural language feedback;
having the computer receive user feedback via the graphical user interface;
having the hardware processor modify the initial individual model to create a modified individual model based on the received user feedback and further implicit learning from photo analysis, using the machine learning algorithm;
having the hardware processor re-select the set of photos for one of two purposes: (1) refining the photo selection based on the modified individual model, or (2) selecting an alternative set from a new group of uploaded photos, both influenced by the modified individual model, wherein the modified individual model has an impact on both data generated by the machine learning algorithm and final selection criteria employed by the machine learning algorithm;
displaying the re-selected set of photos to the user via the computer device;
having the hardware processor monitor new content uploaded into the non-transitory computer-readable storage medium; and
having the hardware processor reassess and adjust the modified individual model and the assigned persona based on the new content and further implicit learning from the photo analysis, using the machine learning algorithm.

20. The computer-implemented method recited in claim 19, wherein the plurality of content comprises a group of photos.

* * * * *